US012552088B2

(12) United States Patent
Bergman et al.

(10) Patent No.: US 12,552,088 B2
(45) Date of Patent: Feb. 17, 2026

(54) ACTIVATABLE WRAP MATERIALS AND RELATED METHODS

(71) Applicant: THE GLAD PRODUCTS COMPANY, Oakland, CA (US)

(72) Inventors: Carl L. Bergman, Loveland, OH (US); John Rusnak, Willowbrook, IL (US); Michael O. Johnson, Cincinnati, OH (US); Sean Chang, Cincinnati, OH (US); Mark D. Pszczolkowski, Pleasanton, CA (US); Nancy M. Mack-Robles, Willowbrook, IL (US)

(73) Assignee: THE GLAD PRODUCTS COMPANY, Oakland, CA (US)

( * ) Notice: Subject to any disclaimer, the term of this patent is extended or adjusted under 35 U.S.C. 154(b) by 770 days.

(21) Appl. No.: 16/673,281

(22) PCT Filed: May 2, 2018

(86) PCT No.: PCT/US2018/030580
§ 371 (c)(1),
(2) Date: Nov. 4, 2019

(87) PCT Pub. No.: WO2018/204448
PCT Pub. Date: Nov. 8, 2018

(65) Prior Publication Data
US 2020/0254680 A1     Aug. 13, 2020

Related U.S. Application Data

(60) Provisional application No. 62/502,513, filed on May 5, 2017.

(51) Int. Cl.
*B29C 59/04*     (2006.01)
*B29C 59/00*     (2006.01)
(Continued)

(52) U.S. Cl.
CPC ............ *B29C 59/046* (2013.01); *B29C 59/00* (2013.01); *B31F 1/07* (2013.01); *B65D 65/14* (2013.01);
(Continued)

(58) Field of Classification Search
CPC ........................ C09J 2301/31; C09J 2301/206
See application file for complete search history.

(56) References Cited

U.S. PATENT DOCUMENTS 5,432,231 A     7/1995  Su
6,299,966 B1 *  10/2001 Bonke ........................ C09J 7/20
                                                    428/167
(Continued)

FOREIGN PATENT DOCUMENTS

WO    WO 2011/004662 A1 *  1/2011    ........ C09J 2301/206

OTHER PUBLICATIONS

Merriam-Webster Dictionary, "adhesive" (Year: 2022).*
(Continued)

*Primary Examiner* — Frank J Vineis
*Assistant Examiner* — Nicole T Gugliotta
(74) *Attorney, Agent, or Firm* — Keller Preece PLLC

(57) ABSTRACT

An activatable wrap material includes a film material a first side and a second side opposite the first side. The wrap material includes a plurality of protrusions extending outward from the first side of the wrap material and oriented in a pattern across the first side of the wrap material and a plurality of planar portions defined within the first side of the wrap material and throughout the plurality of protrusions. The wrap material exhibits an average peel adhesion force, when activated against a surface, between about 1.50 g/in to about 3.25 g/in. The wrap material further exhibits an average roll unwind force, when wound on a roll, between about 1.50 g/in to about 5.0 g/in. The wrap material also (Continued)

exhibits an average blocking force, when contacting itself, between about 0.4 g/in² to about 1.30 g/in².

17 Claims, 11 Drawing Sheets

(51) Int. Cl.
| | |
|---|---|
| *B31F 1/07* | (2006.01) |
| *B65D 65/14* | (2006.01) |
| *B65D 65/22* | (2006.01) |
| *B65D 65/38* | (2006.01) |
| *B65D 83/08* | (2006.01) |
| *C09J 7/00* | (2018.01) |
| *C09J 7/30* | (2018.01) |
| *C09J 201/02* | (2006.01) |

(52) U.S. Cl.
CPC ............. *B65D 65/22* (2013.01); *B65D 65/38* (2013.01); *C09J 7/00* (2013.01); *C09J 7/30* (2018.01); *C09J 201/02* (2013.01); *C09J 2301/206* (2020.08); *C09J 2301/31* (2020.08); *C09J 2301/312* (2020.08)

(56) References Cited

U.S. PATENT DOCUMENTS

| | | | |
|---|---|---|---|
| 2002/0081411 A1 | 6/2002 | Hamilton et al. | |
| 2005/0276971 A1 | 12/2005 | Kitchin et al. | |
| 2010/0316845 A1* | 12/2010 | Rule | C09J 7/24 156/60 |
| 2011/0171430 A1* | 7/2011 | Mayers | C09J 7/00 264/293 |
| 2012/0107570 A1* | 5/2012 | Ross | C09J 7/00 156/72 |
| 2016/0312071 A1* | 10/2016 | Yamamoto | C09J 7/00 |
| 2018/0220871 A1* | 8/2018 | Suyama | B32B 5/024 |

OTHER PUBLICATIONS

Encyclopedia.com, "Polymethyl Methacrylate," https://www.encyclopedia.com/science/academic-and-educational-journals/polymethyl-methacrylate (Year: 2022).*
WO 2011/004662 A1, Sakashita et al., English translation (Year: 2011).*
International Search Report & Written Opinion as received in PCT/US18/30580 dated Jul. 9, 2018.
Examination Report as received in Australian application 2018261354 dated May 9, 2022.
Examination Report as received in Canadian application 3,062,539 dated Aug. 15, 2024.

* cited by examiner

ACTIVATABLE WRAP MATERIALS AND RELATED METHODS

This application is a 35 U.S.C. 371 national phase of PCT International Application No. US2018/30580, filed on May 2, 2018, which claims the benefit of U.S. Provisional Application No. 62/502,513, filed on May 5, 2017. The disclosures are hereby incorporated by reference in their entirety.

BACKGROUND

1. The Field of the Invention

The present invention relates to thermoplastic film materials suitable for use to contain, protect, and wrap various items, as well as the preservation of perishable materials such as food items.

2. Background and Relevant Art

One common use of thermoplastic films is as food wraps. There are many physical properties that are desirable in food grade wrap film. For example, it is desirable that the film has a high machine-direction tear resistance so as to avoid tearing or failing when being pulled off of a roll or wrapped about a container or food. At the same time, it is desirable that the transverse-direction tear resistance is low enough to allow the film to be easily torn from the roll, such as when the film is brought in contact with a cutter bar as found in the standard containers used for containing and dispensing flexible food grade wrap film.

In addition to the foregoing, in order to allow the film to seal around a container or object, it is desirable that the film be tacky or otherwise have the ability to cling to a container. At the same time, however, if the film is too tacky, the film can aggressively stick to itself causing blocking. This can make the film difficult to unwind from a roll or even to wrap the film about an object.

Thus, one will appreciate that many of the desirable properties of food grade wrap film are in direct opposition to each other. In view of this, food grade wrap films often have less than ideal properties. For example, a film may have less cling than is ideal to ensure that the film does not block or stick to itself.

Some attempts to overcome these challenges include films with adhesive in recesses in one side of the film. Such adhesives food wraps can provide an ability to cling to an object while still allowing for easy dispensability because the adhesive does not contact adjacent layers when wrapped about itself because the adhesive is within recesses. Unfortunately, such adhesive food wraps typically only have one side with an ability to cling to an object. Furthermore, such adhesive food wraps are costly to produce. Additionally, adhesive food wraps often lose their ability to cling to or adhere to an object after a single use. Thus, after opening a container sealed with an adhesive food wrap, a user often has to use new piece of adhesive food wrap to reclose the container.

To address the foregoing issues, some developers of conventional cling wraps have increased the clinging nature (e.g., tackiness) of the cling wrap via the cling wrap's composition to form "high" cling wrap materials. However, this often reduces ease of dispensability of the cling wrap (e.g., causes the cling wrap to stick to its own roll and causes the cling wrap to become difficult to unroll, cut, dispense, etc.). Furthermore, this often causes the cling wrap to cling to itself such that the cling wrap is difficult to use or even rendered unusable.

These and other disadvantages exist with current conventional food grade wrap films.

BRIEF SUMMARY

Implementations of the present invention solve one or more of the foregoing or other problems in the art with thermoplastic cling wrap films having increased cling, improved dispensability, and improved handling properties. More particularly, the thermoplastic cling wrap films of one or more embodiments include tailored three-dimensional deformation and tailored amounts of cling additives. The tailored three-dimensional deformation helps improve dispensability and improve handling performance. The tailored amount of cling additive increases the ability of the film to cling or seal about an object.

More particularly, the tailored three-dimensional deformation helps increase dispensability by reducing the surface area of the cling wrap film at the interface between layers when the cling wrap film is wound on a roll. Additionally, the tailored three-dimensional deformation helps provide increased handling properties by reducing the tendency of the cling wrap film to cling to itself during handling or wrapping of an object.

Furthermore, the tailored three-dimensional deformation allows a user to selectively activate the cling wrap film. In particular, the user can stretch or extend the cling wrap film in the X/Y direction and/or compress the cling wrap film in the Z-direction to activate either side of the cling wrap film. Activation of the cling wrap film flattens the three-dimensional forms of the cling wrap film to expose more effective surface area of the high tack cling wrap film to the object to which the cling wrap film is to be sealed. Furthermore, a user can tailor the cling of the cling wrap film based on an applied amount of extension and/or compression of the cling wrap film. Thus, the tailored three-dimensional deformation provides the cling wrap film with a cling force that is selectively activatable.

The combination of tailored three-dimensional deformation and tailored amounts of cling additives allows the cling wrap film to overcome the historical trade-off between cling vs. dispensability and handling. In particular, combination of tailored three-dimensional deformation and tailored amounts of cling additives provides the unexpected result of enabling higher cling levels and better sealing while simultaneously providing for better dispensability and handling.

Additional features and advantages of exemplary embodiments of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features of the present disclosure can be obtained, a more particular description of the present disclosure briefly described above will be rendered by reference to specific embodiments thereof which are illustrated in the appended drawings. It should be noted that the figures are not drawn to scale, and that elements of similar structure or function are generally represented by like reference numerals for illustrative purposes throughout the figures. Understanding that these drawings depict only typical embodiments of the present disclosure and are not therefore to be considered to be limiting of its scope, the present disclosure will be described and explained with additional specificity and detail through the use of the accompanying drawings in which.

DETAILED DESCRIPTION

Figure 1:
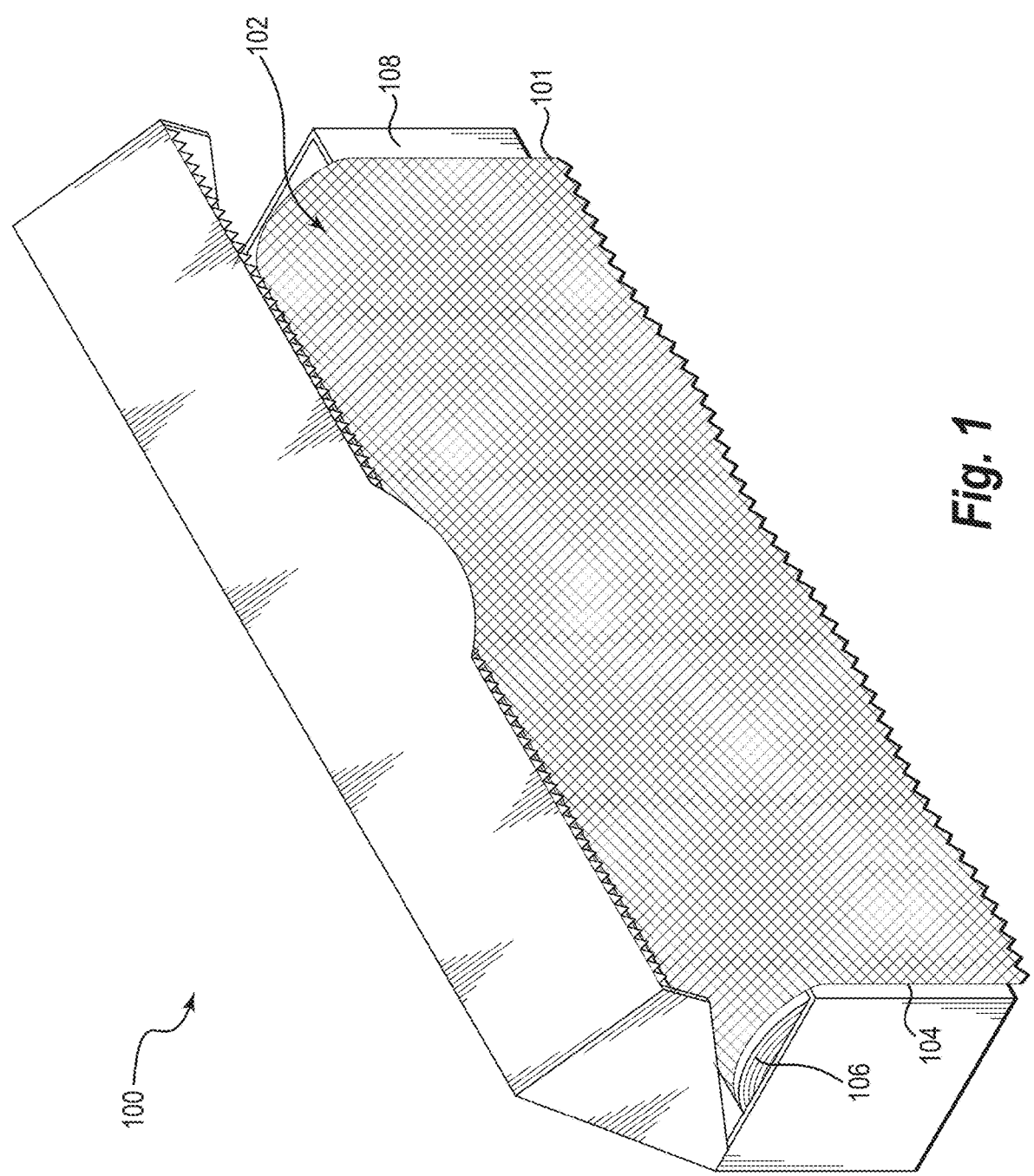
FIG. 1 shows a perspective view of a wrap material within a container according to an embodiment of the present disclosure.

One or more embodiments of the present disclosure include an activatable wrap material for storing and/or protecting items such as perishable items (e.g., food). The wrap material may include a film material having a 3D (3-dimensional) structure formed therein. For example, the 3D structure may include a plurality of protrusions and planar portions. The wrap material may include an active surface (e.g., portion of wrap material that will contact a surface when the wrap material is merely placed on the surface) and an activatable surface (e.g., a portion of the wrap material that will contact a surface when the wrap material is placed on the surface and stretched and/or compressed against the surface) on each side of the wrap material. As a result, the wrap material may be adhered (e.g., stuck) to a surface from either side of the wrap material. Specifically, the wrap material can be activated by compressing the 3D structure (e.g., the protrusions and planar portions) of the wrap material against a surface and causing at least a portion of the activatable surface of the wrap material to come into contact with the surface. By placing more of the wrap material against the surface (e.g., the active surface and at least a portion of the activatable surface), the wrap material's ability to cling to the surface is increased.

In one or more embodiments, the wrap material may exhibit an average peel adhesion force (e.g., a force that is required to peel the wrap material from a surface) when applied to a surface and removed from that surface within a range of about 2.25 g/in to about 7.50 g/in, which is higher than average peel adhesion forces exhibited by conventional wrap materials. Furthermore, the wrap material may exhibit an average roll unwind force (e.g., a force that is required to unwind wrap material from a roll of the wrap material) within a range of about 1.50 g/in to about 5.0 g/in, which is lower than average roll unwind forces exhibited by conventional wrap materials. Moreover, the wrap material may exhibit an average blocking force (e.g., a force required to separate two contacting parallel layers of the wrap material), when clinging to itself, within a range of about 0.40 g/in$^2$ to about 1.30 g/in$^2$, which is less than average blocking force exhibited by conventional wrap materials when clinging to themselves.

Because the wrap material of the present disclosure exhibits a relatively low average roll unwind force, the wrap material may be more easily dispensed (e.g., unwound) from a roll of the wrap material (i.e., a dispenser containing the roll of wrap material) in comparison to conventional wrap materials (e.g., cling wraps). As a result, the wrap material of the present disclosure enables easier cutting via the dispenser and handling of the wrap material in comparison to conventional wrap materials. Furthermore, because the wrap material of the present disclosure exhibits a relatively high average peel adhesion force when applied to a surface, the wrap material of the present disclosure enables the wrap material to be more easily dispensed while not sacrificing an ability to cling (e.g., stick) to surfaces and provide moisture tight and/or airtight protection, unlike conventional wrap materials (e.g., cling wraps), which conventionally sacrifice one of cling ability or ease of dispensability to achieve the other. Accordingly, the wrap material of the present disclosure is advantageous over conventional wrap materials by exhibiting both a relatively low average roll unwind force and a relatively high average peel adhesion force concurrently.

Additionally, because the wrap material of the present disclosure exhibits a relatively low blocking force, the wrap material may be more easily dispensed from a roll of the wrap material and handled when used as, for example, a food wrap in comparison to conventional wrap materials. Specifically, the wrap material of the present disclosure does not stick to itself as much and as strongly as conventional wraps. As a result, the wrap material of the present disclosure may provide a more enjoyable and effective experience for users of the wrap material. Furthermore, because the wrap material of the present disclosure exhibits a relatively high average peel adhesion force, the wrap material of the present disclosure enables the wrap material to be more easily dispensed and handled while not sacrificing an ability to cling (e.g., stick) to surfaces and provide moisture tight and/or airtight protection, unlike conventional wrap materials, which conventionally sacrifice one of cling ability or ease of use to achieve the other. Accordingly, the wrap material of the present disclosure is advantageous over conventional wrap materials by exhibiting both a relatively low blocking force and a relatively high average peel adhesion force concurrently.

Film Materials

As an initial matter, the thermoplastic material of the films of one or more implementations of the present disclosure may include thermoplastic polyolefins, including polyethylene and copolymers thereof and polypropylene and copolymers thereof. The olefin-based polymers may include ethylene or propylene based polymers such as polyethylene, polypropylene, and copolymers such as ethylene vinyl acetate (EVA), ethylene methyl acrylate (EMA) and ethylene acrylic acid (EAA), or blends of such polyolefins.

Other examples of polymers suitable for use as films in accordance with the present disclosure may include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), oriented poly(ethylene-terephthalate), poly(ethylene-butylacrylate), polyurethane, poly(ethylene-propylene-diene), ethylene-propylene rubber, polyvinyl chloride, polyvinylidene chloride, nylon, etc.

Some of the examples and description herein below refer to films formed from linear low-density polyethylene. The term "linear low density polyethylene" (LLDPE) as used herein is defined to mean a copolymer of ethylene and a minor amount of an olefin containing 4 to 10 carbon atoms, having a density of from about 0.910 to about 0.926, and a melt index (MI) of from about 0.5 to about 10. One will appreciate that the present disclosure is not limited to LLDPE, and can include "high density polyethylene" (HDPE), "low density polyethylene" (LDPE), and "very low density polyethylene" (VLDPE), which is also known as "ultra linear low density polyethylene" (ULDPE). LLDPE and ULDPE typically have a density from about 0.87 grams/cubic centimeter ($g/cm^3$) to about 0.94 $g/cm^3$. HDPE has a density from about 0.941 $g/cm^3$ to about 0.965 $g/cm^3$ (i.e., ethylene homopolymer). The density of the LDPE is generally from about 0.9 $g/cm^3$ to about 0.93 $g/cm^3$, preferably from about 0.915 $g/cm^3$ to about 0.925 $g/cm^3$. Each as measured according to ASTM D-92.

Indeed, films made from any of the previously mentioned thermoplastic materials or combinations thereof can be suitable for use with the present disclosure. For example, in at least one implementation, the film comprises LLDPE or mixtures of low-density polyethylene LDPE and LLDPE. In suitable embodiments, the film substrate can be made of modified polyolefins. High modulus materials such as polypropylene, HDPE, polyvinylidene chloride (PVDC or "Saran"), and polyvinyl chloride can comprise one of the layers of the substrate. A high modulus material reduces the tendency for the film to tangle, and tends to correlate with easy tearing of the film, making it easy to cut and dispense. Toughening materials such as LDPE, LLDPE, blends of LDPE and LLDPE, and ethylene vinyl acetate (EVA) can comprise another layer of the substrate. A toughening material can help prevent the film from tearing or splitting when trying to handle the material and, for example, unwrapping the film from a container or object. It is believed that a layer of EVA, ethylene acrylic acid (EAA) or ethylene methacrylic acid (EMA) also helps film stick to food or containers. In a suitable embodiment, the film substrate comprises co-extruded HDPE and LDPE, or co-extruded HDPE, LDPE and polypropylene.

Additives such as antioxidants (e.g., Irgafos™ 168 (a phosphite) and Irganox™ 1010 (a hindered phenolic) both made by Ciba-Geigy Corporation), cling additives (e.g., polyisobutylene (PIB), ethylene vinyl acetate (EVA), amorphous polypropylene, polyterpene, sorbitan monooleate, glycerol monooleate, and microcrystalline wax), antiblock additives, pigments, and the like can also be included in the film substrate.

For food wrap implementations, the film substrate can be made of any flexible polymer as long as it satisfies the Food and Drug Administration (FDA) direct food contact regulations or similar regulations issued in other countries (i.e., it is a "food grade substrate"). In alternative implementations of the present invention can include any flexible or pliable thermoplastic material, which may be formed or drawn into a web or film. Furthermore, the thermoplastic materials may include a single layer or multiple layers (e.g., coextruded layers). Examples of multilayered films suitable for use with one or more implementations of the present invention include coextruded multilayered films, multiple films continuously laminated together, and multiple films partially or discontinuously laminated together. The thermoplastic material may be opaque, transparent, translucent, or tinted. Furthermore, the thermoplastic material may be gas permeable or impermeable.

As used herein, the term "flexible" refers to materials that are capable of being flexed or bent, especially repeatedly, such that they are pliant and yieldable in response to externally applied forces. Accordingly, "flexible" is substantially opposite in meaning to the terms inflexible, rigid, or unyielding. Materials and structures that are flexible, therefore, may be altered in shape and structure to accommodate external forces and to conform to the shape of objects brought into contact with them without losing their integrity. In accordance with further prior art materials, web materials are provided which exhibit an "elastic-like" behavior in the direction of applied strain without the use of added traditional elastic. As used herein, the term "elastic-like" describes the behavior of web materials which when subjected to an applied strain, the web materials extend in the direction of applied strain, and when the applied strain is released the web materials return, to a degree, to their pre-strained condition.

In addition to the foregoing, one of ordinary skill in the art will appreciate in view of the present disclosure that manufacturers may form the films or webs to be used with the present disclosure using a wide variety of techniques. For example, a manufacturer can form precursor mix of the thermoplastic material and one or more additives. The manufacturer can then form the film(s) from the precursor mix using conventional flat or cast extrusion or coextrusion to produce monolayer, bilayer, or multilayer films. Alternatively, a manufacturer can form the films using suitable processes, such as, a blown film process to produce monolayer, bilayer, or multilayer films. If desired for a given end use, the manufacturer can orient the films by trapped bubble, tenterframe, or other suitable process. Additionally, the manufacturer can optionally anneal the films thereafter.

An optional part of the film-making process is a procedure known as "orientation." The orientation of a polymer is a reference to its molecular organization, i.e., the orientation of molecules relative to each other. Similarly, the process of orientation is the process by which directionality (orientation) is imposed upon the polymeric arrangements in the film. The process of orientation is employed to impart desirable properties to films, including making cast films tougher (higher tensile properties). Depending on whether the film is made by casting as a flat film or by blowing as a tubular film, the orientation process can require different procedures. This is related to the different physical characteristics possessed by films made by the two conventional film-making processes; casting and blowing. Generally, blown films tend to have greater stiffness and toughness. By contrast, cast films usually have the advantages of greater film clarity and uniformity of thickness and flatness, generally permitting use of a wider range of polymers and producing a higher quality film.

In one or more implementations, the films of the present disclosure are blown film, or cast film. Blown film and cast film is formed by extrusion. The extruder used can be a conventional one using a die, which will provide the desired gauge. Some useful extruders are described in U.S. Pat. Nos. 4,814,135; 4,857,600; 5,076,988; 5,153,382; each of which are incorporated herein by reference in their entirety. Examples of various extruders, which can be used in producing the films to be used with the present disclosure, can be a single screw type modified with a blown film die, an air ring, and continuous take off equipment.

In one or more embodiments, a manufacturer can use multiple extruders to supply different melt streams, which a feed block can order into different channels of a multi-channel die. The multiple extruders can allow a manufacturer to form a multi-layer film with layers having different compositions. Such multi-layer film may later be non-continuously laminated with another layer of film to provide the benefits of the present disclosure.

In a blown film process, the die can be an upright cylinder with a circular opening. Rollers can pull molten plastic upward away from the die. An air-ring can cool the film as the film travels upwards. An air outlet can force compressed air into the center of the extruded circular profile, creating a bubble. The air can expand the extruded circular cross section by a multiple of the die diameter. This ratio is called the "blow-up ratio." When using a blown film process, the manufacturer can collapse the film to double the plies of the film. Alternatively, the manufacturer can cut and fold the film, or cut and leave the film unfolded.

In any event, in one or more embodiments, the extrusion process can orient the polymer chains of the blown film. Again, the "orientation" of a polymer is a reference to its molecular organization, i.e., the orientation of molecules or polymer chains relative to each other. In particular, the extrusion process can cause the polymer chains of the blown film to be predominantly oriented in the machine direction. The orientation of the polymer chains can result in an increased strength in the direction of the orientation. As used herein predominately oriented in a particular direction means that the polymer chains are more oriented in the particular direction than another direction. One will appreciate, however, that a film that is predominately oriented in a particular direction can still include polymer chains oriented in directions other than the particular direction. Thus, in one or more embodiments the initial or starting films (films before being stretched or bonded or laminated in accordance with the principles described herein) can comprise a blown film that is predominately oriented in the machine direction.

The process of blowing up the tubular stock or bubble can further orient the polymer chains of the blown film. In particular, the blow-up process can cause the polymer chains of the blown film to be bi-axially oriented. Despite being bi-axially oriented, in one or more embodiments the polymer chains of the blown film are predominantly oriented in the machine direction (i.e., oriented more in the machine direction than the transverse direction).

Traditionally, cast film processes are a preferred method of producing the films for food wrap because, by this method, it is easier to create the film (i.e., control the film's properties). The property of the film that is more easily controlled by the cast film process is the gauge variation. That is, typically a manufacturer can more easily maintain the gauge variation of a film within the preferred thickness ranges using a cast film process (as opposed to the blown extrusion process). Controlling the gauge variation in a film during the blown extrusion process can become a particular challenge as the film becomes thinner. This is because the degree of variation is fixed and becomes a greater percentage of the width of the object being extruded as the film becomes thinner.

One or more implementations of the present invention, however, can allow for the use of blown films. In particular, one or more implementations allow for the use of blown films with initially thicker gauges that are later thinned using a stretching process. Additionally, or alternatively, in one or more implementations the amount of incremental stretching to maintain or increase the MD tear resistance or other properties of the film can be based, at least in part, on the starting gauge of the film being stretched. As used herein, the term "starting gauge" or "initial gauge" refers to the average distance between the major surfaces of a film before it is incrementally stretched. The films of one or more implementations of the present invention can have a starting gauge between about 0.1 mils to about 20 mils, suitably from about 0.2 mils to about 4 mils, suitably in the range of about 0.3 mils to about 2 mils, and suitably from about 0.3 mils and about 0.6 mils. Additionally, the starting gauge of films of one or more implementations of the present invention may not be uniform. Thus, the starting gauge of films of one or more implementations may vary along the length and/or width of the film.

As used in this patent application, a "mil" is a unit of length, equal to 0.001 inch, or to $2.54 \times 10^{-5}$ meter. Furthermore, it is preferable for the film to have certain Elmendorf tear properties and 2 percent secant modulus properties, and for the polymers, polymer blends or co-extrusions used to manufacture the substrate to be selected accordingly. In the transverse direction of the film, the Elmendorf tear property, or TD tear resistance, is a measure of how easy it will be to dispense a film by cutting it (e.g., with a cutter bar). In the machine direction the Elmendorf tear property, or MD tear resistance, is a measure of how easy it will be for a film to avoid splitting. In the TD tear resistance of a film in one or more implementations will be between about 40 grams and about 400 grams, more suitably between about 40 grams and about 150 grams, and most suitably between about 40 grams and about 100 grams. The MD tear resistance in one or more implementations will be between about 60 grams and about 300 grams, more suitably between about 80 grams and about 300 grams, and most suitably between about 100 grams and about 200 grams. The TD tear resistance is preferably less than or equal to 50 percent of the MD tear resistance in one or more implementations.

As an additional matter, one or more layers of the films described herein can comprise any flexible or pliable material comprising a thermoplastic material and that can be formed or drawn into a web or film. As described above, the film includes a plurality of layers of thermoplastic films. Each individual film layer may itself include a single layer or multiple layers. In other words, the individual layers of the multi-layer film may each themselves comprise a plurality of laminated layers. Such layers may be significantly more tightly bonded together than the bonding provided by the purposely weak discontinuous bonding in the finished multi-layer film. Both tight and relatively weak lamination can be accomplished by joining layers by mechanical pressure, joining layers with adhesives, joining with heat and pressure, spread coating, extrusion coating, and combinations thereof. Adjacent sub-layers of an individual layer may be coextruded. Coextrusion results in tight bonding so that the bond strength is greater than the tear resistance of the resulting laminate (i.e., rather than allowing adjacent layers to be peeled apart through breakage of the lamination bonds, the film will tear).

As used herein, the term "substantially," in reference to a given parameter, property, or condition, means to a degree that one of ordinary skill in the art would understand that the given parameter, property, or condition is met within a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, any relational terms such as "first," "second," "inner," "outer," "upper," "lower," "side," "top," "bottom," "upward," "outward," etc. are for clarity and convenience in understanding the present disclosure and accompanying drawings and does not connote or depend on any specific preference, orientation, or order, except where the context clearly indicates otherwise. For example, the relational terms may refer an orientation of a wrap material while disposed on a planar horizontal surface.

As used herein, the terms "active surface," when used in reference to a wrap material, may refer to a surface or surfaces of the wrap material that contact a surface (e.g., a food container surface) when the wrap material is placed against the surface without any additional load (e.g., pressure). For example, when referring to a wrap material with peaks and valleys, the active surface would include the top surfaces of the peaks of the wrap material because the top surfaces of the peaks would be the surfaces that would contact the surface. For instance, the active surface of a wrap material includes a surface or surfaces that are always available to contact another surface (e.g., glass) without the wrap material being compressed against the another surface.

As used herein, the terms "activatable surface," when used in reference to a wrap material, may refer to a surface or surfaces of the wrap material that are available to contact a surface when the wrap material is compressed against a surface with an additional load. For example, when referring to a wrap material with peaks and valleys, the activatable surface would include the surfaces of the peaks of the wrap material, at least some portions of the side surfaces of the peaks, and at least some portions of the valley surfaces. Furthermore, as will be discussed in greater detail below, causing the activatable surface of a wrap material to contact a surface increases the wrap material's ability to adhere to the surface. For example, causing the activatable surface of a wrap material to contact a surface causes more tack and cling elements of the wrap material's composition (e.g., more surface area of the wrap material's composition) to contact the surface.

As used herein, the "land area" of a wrap material may refer to an area coverable by the wrap material in a non-activated state. Specifically, if a portion of wrap material includes a 2.0 inch by 2.0 inch square in a non-activated state (i.e., without additional loads), the land area of the wrap material would be 4.0 in$^2$. For instance, the land area may be equal to a surface area of a plane defined by outer borders of the portion of wrap material in a non-activated state and parallel to planar portions of the wrap material.

FIG. 1 shows a perspective view of a wrap material 100 according to an embodiment of the present disclosure. As illustrated, the wrap material 100 may include a film material 101, such as one or more of the films described above, and/or a web of flexible material. The wrap material 100 may be woundable upon a core to form a roll 106. As is illustrated, the roll 106 may be insertable into a dispenser 108 (e.g., holder or carton). The wrap material 100 may include a first side and second side opposite the first side. Furthermore, as shown in FIG. 1, in some embodiments, the wrap material 100 may not include an adhesive layer. As is discussed in further detail below in regard to FIGS. 4A-9, each side of the wrap material 100 may include an active surface and an activatable surface that, when activated, increases a cling (e.g., adhesion, tacking) ability of the wrap material 100. Also, as will be discussed in greater detail below, the wrap material 100 can be adhered (e.g., stuck) to a surface from either side.

Figure 2:
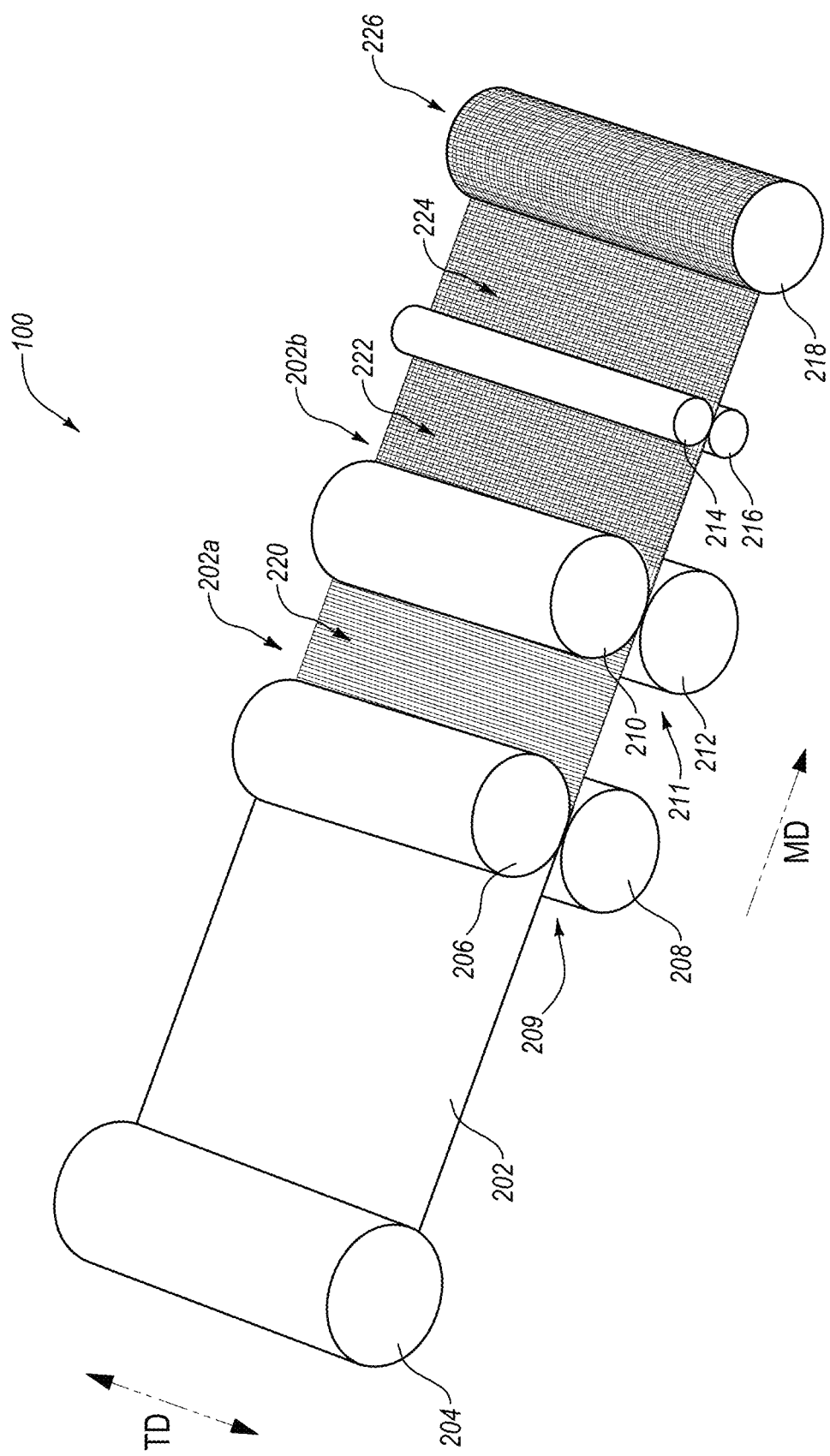
FIG. 2 shows a schematic diagram of a wrap material manufacturing process according to one or more embodiments of the present disclosure.

FIG. 2 illustrates an example embodiment of a high-speed manufacturing process 200 for embossing and/or incrementally stretching a thermoplastic film in one or more of a machine direction (MD), a transverse direction (TD), a diagonal direction (DD), or another direction to form a wrap material (e.g., the wrap material 100). According to the process, a flat thermoplastic film 202 is unwound from a roll 204 and directed along a machine direction (MD). The flat film 202 can pass between one or more pairs of cylindrical rollers to emboss and/or incrementally stretch the flat film 202 and impart a pattern of peaks and valleys (e.g., a diamond pattern of peaks and valleys) thereon. For example, FIG. 2 illustrates that the flat film 202 can pass through a first pair of rollers 206, 208 and a second pair of rollers 210, 212.

In some embodiments, the first pair of rollers 206, 208 may form an embossing system 209. Furthermore, in one or more embodiments, a first roller 206 of first pair of rollers 206, 208 may have an embossing pattern formed (e.g., engraved) thereon, and the second roller 208 may be relatively smooth. The embossing pattern of the first roller 206 may have a depth of between about 10.0 mils and about 40.0 mils. Furthermore, the embossing pattern may match one or more of the below-described patterns of peaks and valleys described in regard to FIGS. 4A-10C.

In some embodiments, the first roller 206 may be formed from a relatively hard material (e.g., steel, ebonite or any other suitable hard material), and the second roller 208 may be formed from a softer material (e.g., rubber or any other suitable softer material). In other words, the embossing system 209 may include a steel-to-rubber embosser. In alternative embodiments, both the first roller 206 and the second roller 208 may be formed from the relatively hard material (e.g., steel). Put another way, the embossing system 209 may include a steel-to-steel embosser. Regardless of whether the embossing system 209 includes a steel-to-rubber embosser or a steel-to-steel embosser, the first roller 206, second roller 208, or both rollers may include an electrically heated steel roll (e.g., a means of heating). In alternative embodiments, the first and second rollers 206, 208 are not heated.

As noted above, during the manufacturing process 200, the flat film 202 may pass through the embossing system 209. Specifically, the flat film 202 may pass between the first roller 206 and the second roller 208 of the first pair of rollers 206, 208. The first roller 206 may heat the flat film 202 and may press the flat film 202 against the second roller 208 (e.g., a pressure roller). By heating the flat film 202 and pressing the flat film 202 against the second roller 208 (e.g., pressing the embossing pattern of the first roller 206 against the flat film 202), the first roller 206 embosses the flat film 202 with the embossing pattern. Alternatively, the first and second rollers 206, 208 can emboss the flat film 202 without the use of heat. In some embodiments, the flat film 202 may be pulled through the embossing system by pinch rollers 214, 216 (i.e., tension rollers) and/or an end roll 218.

In one or more embodiments, the first pair of rollers 206, 208 may emboss the flat film with a first pattern 220, and the second pair of rollers 210, 212 may emboss the flat film 202 with a second pattern 222 (e.g., another pattern overlaying the first pattern) to form a final pattern 224. For example, the second pair of rollers 210, 212 may form an additional embossing system 211 and may include any of the combinations of rollers described above in regard to the embossing system 209. In alternative embodiments, the manufacturing process 200 may not include the second pair of rollers 210, 212. In other words, in some embodiments, the second pair of rollers 210, 212 may not necessary, and the first pair of rollers 206, 208 may emboss the flat film 202 with the final pattern 224.

In alternative embodiments, as noted above, the first pair of rollers 206, 208 may include a first pair of intermeshing rollers, and the second pair of rollers 210, 212 may include a second pair of intermeshing rollers. In one or more implementations, the flat film 202 can pass through: only MD intermeshing rollers; only TD intermeshing rollers; only DD intermeshing rollers; through TD intermeshing rollers and then MD intermeshing rollers, through SELFing (Structural Elastic Formation) rollers (e.g., Force Flex SELFing rollers and/or microSELF rollers), ring rolling, or any combination of the foregoing.

The rollers 206, 208, 210, 212 may be arranged so that their longitudinal axes are perpendicular to the machine direction (MD). Additionally, the rollers 206, 208 and rollers 210, 212 may rotate about their longitudinal axes in opposite rotational directions. In various embodiments, motors may be provided that power rotation of the rollers 206, 208, 210, 212 in a controlled manner. As the flat film 202 passes between the first pair of rollers 206, 208, the ridges (e.g., teeth) of the intermeshing rollers can impart a pattern (e.g., a ribbed pattern, diamond pattern, etc.) and can incrementally stretch the film, thereby creating an incrementally-stretched film 202a. Then, as the incrementally-stretched film 202a passes between the second pair of rollers 210, 212, the ridges (e.g., teeth) of the intermeshing rollers can impart another pattern and incrementally stretch the film in another direction, thereby creating an incrementally-stretched film 202b in two directions.

During the manufacturing process 200, the incrementally-stretched film 202b can also pass through the pair of pinch rollers 214, 216. The pinch rollers 214, 216 can be appropriately arranged to grasp the incrementally-stretched film 202b. The pinch rollers 214, 216 may facilitate and accommodate the incrementally-stretched film 202b. Eventually, the incrementally-stretched film 202b can be rolled onto the end roll 218.

Regardless of whether the manufacturing process includes embossing and/or incrementally-stretching the flat film 202 to form the wrap material 226, the manufacturing process may form a 3D (3-dimensional) structure (e.g., a plurality of peaks and valleys) into the flat film 202 to form the wrap material 226. Additionally, the 3D structure is permanently set such that the wrap material 226 does not return to its flat film form via strain relaxation. Furthermore, the 3D structure of the wrap material 226 may be maintained within the end roll 218 (i.e., the 3D structure may not be substantially compressed within the roll 218) by varying the tension of the wrap material 226 as the end roll 218 is wound. The 3D structure of the wrap material 226 is discussed in greater detail in regard to FIGS. 4A-10.

One will appreciate in light of the disclosure herein that the process 200 described in relation to FIG. 2 can be modified to omit and/or expand acts, or vary the order of the various acts as desired.

In one or more embodiments, a composition of the wrap material may include a percent by weight of LDPE (e.g., Westlake EP413AA LDPE Resin (3.0 MI, 0.923d)) within a range of about 47.0% to about 99.5%, LLDPE (e.g., DOWLEX* 2083G LLDPE C8 Polyethylene Resin (2.0 MI, 0.925d)) within a range of about 0.0% to about 50.0%, and cling additives (e.g., polyisobutylene (PIB) (e.g., BP Indopol H-100)) within a range of about 0.5% to about 3.0%. In some embodiments, a composition of the wrap material may include a percent by weight of cling additives (e.g., polyisobutylene (PIB)) within a range of about 0.13% to about 0.57%. In additional embodiments, the composition of the wrap material may include a percent by weight of cling additives within a range of about 0.8% to about 1.5%. In additional embodiments, the composition of the wrap material may include a percent by weight of cling additives within a range of about 0.70% to about 2.5%. In further embodiments, the composition of the wrap material may include a percent by weight of cling additives within a range of about 0.50% to about 3.0%. In yet further embodiments, the composition of the wrap material may include a percent by weight of cling additives within a range of about 0.0% to about 0.50%. In yet further embodiments, the composition of the wrap material may include a percent by weight of cling additives of more than 3.0%.

Furthermore, as will be discussed in greater detail below, in one or more embodiments, after passing through the manufacturing process (i.e., the embossing and/or stretching of the flat film 202), a resulting wrap material 226 (e.g., the wrap material wound on end roll 218) may include an active surface that include between about between about 15% and about 60% of a land area of the wrap material. For example, in some embodiments, the active surface of the wrap material may include about 21% of the land area of the wrap material. In additional embodiments, the active surface of the wrap material may include between about 25% and about 50% of a land area of the wrap material. For instance, the active surface of the wrap material may include about 50% of the land area of the wrap material. In further embodiments, the active surface of the wrap material may include between about 35% and about 40% of a land area of the wrap material. In view of the foregoing, in one or more embodiment, the activatable surface, which includes the active surface, of the wrap material may include between about 75% and about 99% of the land area of the wrap material.

Additionally, in one or more embodiments, after passing through the manufacturing process (i.e., the embossing and/or stretching of the flat film 202), a resulting wrap material 226 (e.g., the wrap material wound on end roll 218) may exhibit unexpected advantages and qualities when compared to conventional wrap materials. Specifically, the wrap material 226 of the present disclosure may exhibit an average peel adhesion force, when applied to glass and activated against the glass, that is equal to or higher than average peel adhesion forces exhibited by other conventional wrap materials. Furthermore, the wrap material 226 of the present disclosure may exhibit an average roll unwind force that is less than average roll unwind forces exhibited by other conventional wrap materials. Moreover, the wrap material 226 of the present disclosure may exhibit an average blocking force, when clinging to itself, that is less than average blocking forces exhibited by other conventional wrap materials when clinging to themselves.

For example, depending on the composition, the structure, and an amount of deformation (e.g., compression) of the wrap material 226, the average peel adhesion force can be uncoupled from the average roll unwind force and the average blocking force. In particular, in conventional wraps, the average peel adhesion force is proportional to the average roll unwind force and the average blocking force. In other words, with conventional wraps, if the peel adhesion force is increased, the average roll unwind force and average blocking force of the wrap material also increases. However, the wrap material of the present disclosure enables the average peel adhesion force exhibited by the wrap material to be increased without increasing the average roll unwind force and/or the average blocking force exhibited by the wrap material and vice-versa.

Average Peel Adhesion Force

As noted above, the wrap material 226 of the present disclosure may exhibit an average peel adhesion force, when applied to a surface and removed from that surface, that is higher than average peel adhesion forces exhibited by conventional wrap materials and comparable to (e.g., on par with) the average peel adhesion forces exhibited by high cling wrap materials. As used herein, the terms "peel adhesion force" may refer to a force that is required to peel (e.g., remove) the wrap material (e.g., the wrap material 226) from a surface after the wrap material has been applied to the surface and activated (e.g., compressed) against the surface. As used herein the term "activate" and any derivative terms may refer to the wrap material being compressed (e.g., at least partially deformed) against a surface with a pressure and causing at least a portion of the activatable surface of the wrap material 226 to come into contact with the surface. The compression and activation may be accomplished in a variety of ways, including direct compression in a Z-direction, and/or stretching/extension in an X-Y direction, and then wrapping the wrap material 226 around the edge of a container while maintaining at least some force along the longitudinal axis of the wrap material 226.

The average peel adhesion force of the wrap material of the present disclosure (e.g., wrap material 226) was determined using the American Society for Testing and Materials (ASTM) international standard D3330: Test Method F and the Pressure Sensitive Tape Council (PSTC) international standard 101: Test Method F. In particular, a strip of the wrap material of the present disclosure was applied to glass, specifically, BOROFLOAT borosilicate float glass, with a controlled pressure, and the strip of wrap material was peeled from the glass at a 90° angle at a specified rate, during which time the force required to effect the peel was measured. Furthermore, a 3-inch wide strip of the wrap material was tested and normalized to determine a per inch peel adhesion force. A rubber covered steel roller was used to apply the controlled pressure to the wrap material, and the rubber covered steel roller had a mass of 3.5±0.1 lb per inch of width of the strip of wrap material. Therefore, the roll down pressure was 3.5 PLI. Additionally, the wrap material was peeled for approximately 5.12 inches. Data was collected after 1 inch of the strip was peeled.

As mentioned above, in testing performed by the inventors, the average peel adhesion force exhibited by the wrap material of the present disclosure (e.g., wrap material 226) was found to be more than the average peel adhesion forces exhibited by other conventional wrap materials (e.g., cling wraps) and to be comparable to the average peel adhesion forces exhibited by high cling wrap materials. As will be discussed in greater detail below, this finding is unexpected because, while the wrap material of the present disclosure exhibits a relative higher average peel adhesion force when pressed against a surface, the wrap material of the present disclosure also exhibits a blocking force that is lower than conventional wrap material. Thus, due to the other exhibited properties of the wrap material of the present disclosure that are discussed below, finding that the wrap material of the present disclosure exhibits a relatively higher average peel adhesion force is unexpected In view of the foregoing, the wrap material (e.g., the wrap material 226) may be advantageous over conventional wrap materials (e.g., cling wraps). For example, because the wrap material of the present disclosure exhibits a relatively high average peel adhesion force, the wrap material may more strongly cling (e.g., adhere, stick) to surfaces in comparison to conventional wrap materials (e.g., cling wraps). For example, the wrap material of the present disclosure may include sufficient cling properties (e.g., tacking, adhesive, and/or adherent properties) to attach the wrap material to complex shapes (e.g., uneven) and complex surfaces (e.g., polished and/or rough). In other words, the wrap material exhibits sufficient adhesive properties to form a bond to most common materials that is sufficiently strong to survive (e.g., endure) handling without failure. In other words, the wrap material may maintain the bond to the surface even when subject to typical handling. The bond between the wrap material and the surface is also sufficient to provide a barrier seal against transmission of oxygen, moisture/moisture vapor, odor, etc. such that perishable items may be satisfactorily enclosed and preserved to the extent of the barrier properties of the wrap material itself. As a result, the wrap material of the present disclosure may provide a more effective seal in comparison to conventional wrap materials.

Average Roll Unwind Force

As mentioned above, the wrap material of the present disclosure (e.g., wrap material 226) may exhibit an average roll unwind force that is less than average roll unwind forces exhibited by conventional wrap materials. As used herein, the terms "roll unwind force" may refer to a force that is required to unwind wrap material (e.g., remove a wrap material) from a roll of the wrap material. In particular, the roll unwind force is a measure of blocking of the wrap material as the wrap material comes off of the roll of wrap material.

The average roll unwind force of the wrap material of the present disclosure (e.g., the wrap material 226) was determined using the PSTC international standard 8. Specifically, a 12 inch wide roll of the wrap material was mounted to a free roller assembly, and the film was removed (e.g., unwound) at a rate of 300 mm/min (12 inches/min). After 24 mm (1 inch) of the wrap material was mechanically unwound, the average value of required force was observed during the next 20.0 inches. The results were normalized to calculate (e.g., determine) g/in of roll width. Furthermore, the average roll unwind force of the wrap material of the present disclosure was determined with the wrap material in an inactivated state.

As noted above, in testing performed by the inventors, the wrap material of the present disclosure may exhibit an average roll unwind force that is less than average roll unwind forces exhibited by other conventional wrap materials. This finding is unexpected, as it is generally understood that, if a wrap material exhibits a relatively lower average roll unwind force, the wrap material will exhibit a relatively lower average peel adhesion force. However, as discussed above, the wrap material exhibits a relatively lower average roll unwind force and a relatively higher average peel adhesion force concurrently. Thus, finding that the wrap material exhibits a relatively lower average roll unwind force while exhibiting a relatively higher average peel adhesion force is unexpected.

In view of the foregoing, the wrap material (e.g., the wrap material 226) may be advantageous over conventional wrap materials (e.g., cling wraps). For example, because the wrap material of the present disclosure exhibits a relatively low average roll unwind force, the wrap material may be more easily dispensed (e.g., unwound) from a roll of the wrap material (i.e., a dispenser 108 containing the roll of wrap material) in comparison to conventional wrap materials (e.g., cling wraps). As a result, the wrap material of the present disclosure enables easier cutting via the dispenser 108 and handling of the wrap material in comparison to conventional wrap materials. Furthermore, because the wrap material of the present disclosure exhibits a relatively high average peel adhesion force, the wrap material of the present disclosure enables the wrap material to be more easily dispensed and handled while not sacrificing an ability to cling (e.g., stick to) surfaces, unlike conventional wrap materials, which typically sacrifice one of cling ability or ease of dispensability to achieve the other. Accordingly, the wrap material of the present disclosure is advantageous over conventional wrap materials by exhibiting both a relatively low average roll unwind force and a relatively high average peel adhesion force concurrently.

Average Blocking Force

As discussed previously, the wrap material of the present disclosure (e.g., wrap material 226) exhibits an average blocking force, when clinging to itself, that is less than average blocking forces exhibited by conventional wrap materials (e.g., cling wraps) when clinging to themselves. As used herein, the terms "average blocking force," when used in reference to a wrap material clinging to itself, may refer to a force required to separate two contacting parallel layers of the wrap material. For example, the average blocking force yields quantitative information regarding a degree of blocking (e.g., unwanted adhesion and/or clinging) existing between layers of the wrap material.

The average blocking force of the wrap material of the present disclosure (e.g., wrap material 226) was determined using the ASTM international standard D3354: Procedure B—Constant-Rate-of-Separation-Device. Specifically, two 100 mm×100 mm squares of the wrap material were placed in contact with each other between two blocks without an additional load. The two 100 mm×100 mm squares of the wrap material were separated completely, and the maximum required force was recorded in grams. Any results were normalized to calculate (e.g., determine) $g/in^2$ of average blocking force of the two 100 mm×100 mm squares of the wrap material. Furthermore, the average blocking force of the wrap material was measured in an inactivated state.

As discussed above, in testing performed by the inventors, the average blocking force exhibited by the wrap material of the present disclosure, when clinging to itself, is less than average blocking forces exhibited by conventional wrap materials (e.g., cling wraps) when clinging to themselves. This finding is unexpected, as it is generally understood that, if a wrap material exhibits a relatively lower average blocking force, the wrap material will also exhibit a relatively lower average peel adhesion force. However, as discussed above, the wrap material exhibits a relatively lower average blocking force and a relatively higher average peel adhesion force concurrently. Thus, finding that the wrap material exhibits a relatively lower average blocking force while exhibiting a relatively higher average peel adhesion force is unexpected.

In view of the foregoing, the wrap material (e.g., the wrap material 226) may be advantageous over conventional wrap materials (e.g., cling wraps). For example, because the wrap material of the present disclosure exhibits a relatively low blocking force, the wrap material may be more easily dispensed (e.g., unwound) from a roll of the wrap material (i.e., a dispenser 108 containing the roll of wrap material) and handled when used as, for example, a food wrap in comparison to conventional wrap materials (e.g., cling wraps). Specifically, the wrap material may not stick to itself as much and as strongly as conventional wraps. As a result, the wrap material of the present disclosure may provide a more enjoyable and effective experience for users of the wrap material. Furthermore, because the wrap material of the present disclosure exhibits a relatively high average peel adhesion force, the wrap material of the present disclosure enables the wrap material to be more easily dispensed and handled while not sacrificing an ability to cling to (e.g., stick to) surfaces, unlike conventional wrap materials (e.g., cling wraps), which typically sacrifice one of cling ability or ease of use to achieve the other. Accordingly, the wrap material of the present disclosure is advantageous over conventional wrap materials by exhibiting both a relatively low blocking force and a relatively high average peel adhesion force concurrently.

Table 1 below shows as comparison of the determined average peel adhesion force, the determined average roll unwind force of the wrap material, and determined average blocking force of a first embodiment of the wrap material of the present disclosure in comparison to conventional wrap materials (e.g., cling wraps) in accordance with a first experiment.

TABLE 1

Comparison of properties of a first embodiment of a wrap material of the present disclosure

| Standard | Property | Orientation | Conv. film 1 | Conv. High Cling film | Wrap material of present disclosure First Experiment |
|---|---|---|---|---|---|
| ASTM-D3330/PSTC-101 | Peel Adhesion (g/in) | N/A | 2.07 | 3.24 | 2.77 |
| PSTC-8 | Roll Unwind (g/in) | N/A | 7.33 | 5.65 | 4.26 |
| ASTM D3354: Procedure B | Blocking (g/in$^2$) | Outside to outside | 1.31 | 1.36 | 0.44 |
| ASTM D3354: Procedure B | Blocking (g/in$^2$) | Inside to inside | 1.42 | 1.71 | 0.59 |

Table 2 below shows as comparison of the determined average peel adhesion force, the determined average roll unwind force of the wrap material, and determined average blocking force of a second embodiment of the wrap material of the present disclosure in comparison to conventional wrap materials (e.g., cling wraps) in accordance with a second experiment.

TABLE 2

Comparison of properties of a second embodiment of a wrap material of the present disclosure

| Standard | Property | Orientation | Conv. film 2 | Wrap material of present disclosure Second Experiment |
|---|---|---|---|---|
| ASTM-D3330/PSTC-101 | Peel Adhesion (g/in) | N/A | 2.05 | 2.22 |
| PSTC-8 | Roll Unwind (g/in) | N/A | 5.14 | 3.00 |
| ASTM D3354: Procedure B | Blocking (g/in$^2$) | Outside to outside | 4.70 | 1.29 |
| ASTM D3354: Procedure B | Blocking (g/in$^2$) | Inside to inside | 4.96 | 0.90 |

Referring to Tables 1 and 2, in some embodiments, the wrap material of the present disclosure may exhibit an average peel adhesion force within a range of about 1.50 g/in to about 3.25 g/in. In additional embodiments, the wrap material of the present disclosure may exhibit an average peel adhesion force within a range of about 1.75 g/in to about 3.05 g/in. In further embodiments, the wrap material of the present disclosure may exhibit an average peel adhesion force within a range of about 2.00 g/in to about 2.85 g/in. For example, in one or more embodiments, the wrap material of the present disclosure may exhibit an average peel adhesion force of 2.77 g/in. In additional embodiments, the wrap material of the present disclosure may exhibit an average peel adhesion force of 2.22 g/in.

Furthermore, in some embodiments, the wrap material of the present may exhibit an average roll unwind force within a range of about 1.50 g/in to about 5.0 g/in. In additional embodiments, the wrap material of the present disclosure may exhibit an average roll unwind force within a range of about 2.50 g/in to about 4.50 g/in. In further embodiments, the wrap material of the present disclosure may exhibit an average roll unwind force within a range of about 3.00 g/in to about 4.25 g/in. For example, in one or more embodiments, the wrap material of the present disclosure may exhibit an average roll unwind force of 4.27 g/in. In additional embodiments, the wrap material of the present disclosure may exhibit an average roll unwind force of 2.99 g/in.

Moreover, in one or more embodiments, the wrap material of the present may exhibit an average blocking force within a range of about 0.10 g/in$^2$ to about 1.30 g/in$^2$. In additional embodiments, the wrap material of the present disclosure may exhibit an average blocking force within a range of about 0.40 g/in$^2$ to about 1.2 g/in$^2$. In further embodiments, the wrap material of the present disclosure may exhibit an average blocking force within a range of about 0.50 g/in$^2$ to about 1.10 g/in$^2$. For example, in one or more embodiments, the wrap material of the present disclosure may exhibit an average blocking force of 0.5 g/in$^2$. In alternative embodiments, the wrap material of the present disclosure may exhibit an average blocking force of 1.1 g/in$^2$.

Still referring to the Tables 1 and 2, in one or more embodiments, the wrap material of the present disclosure may exhibit an average roll unwind force that is greater than the exhibited peel adhesion force of the wrap material. In particular, the wrap material of the present disclosure may exhibit an average roll unwind force between 1 and 3 times the exhibited peel adhesion force of the wrap material. More particularly, the wrap material of the present disclosure may exhibit an average roll unwind force between 1 and 2.25 times the exhibited peel adhesion force of the wrap material. In still further embodiments, the wrap material of the present disclosure may exhibit an average roll unwind force 1.54 times the exhibited peel adhesion force of the wrap material. In yet further embodiments, the wrap material of the present disclosure may exhibit an average roll unwind force about 1.35 times the exhibited peel adhesion force of the wrap material.

Furthermore, the wrap material of the present disclosure may exhibit a peel adhesion force that, proportionally, is multiple times the exhibited blocking force of the wrap material. In particular, the wrap material of the present disclosure may exhibit a peel adhesion force that is between 1.5 and 15.0 times the exhibited blocking force of the wrap material. In still further embodiments, the wrap material of the present disclosure may exhibit a peel adhesion force that is between 2.0 and 10.0 times the exhibited blocking force of the wrap material. In yet further embodiments, the wrap material of the present disclosure may exhibit a peel adhesion force that is about 5 times the exhibited blocking force of the wrap material.

Moreover, the wrap material of the present disclosure may exhibit an average blocking force, when measured by placing the outside of the wrap material against the outside, of the wrap material that is at least substantially equal to an exhibited average blocking force when measured by placing the inside of the wrap material against the inside of the wrap material. Additionally, the wrap material of the present disclosure may exhibit an average roll unwind force that is at least 2.0 times the blocking force (either inside to inside or outside to outside) of the wrap material.

One will appreciate in light of the disclosure herein that the particular peel adhesion force, average roll unwind force, and blocking force of a given embodiment can be tailored. In particular, the amount of cling additive, the height of the peaks, and/or the surface area of the activatable surface of a given embodiment of the wrap material can be modified to control the peel adhesion force, average roll unwind force, and blocking force.

Figure 3A:
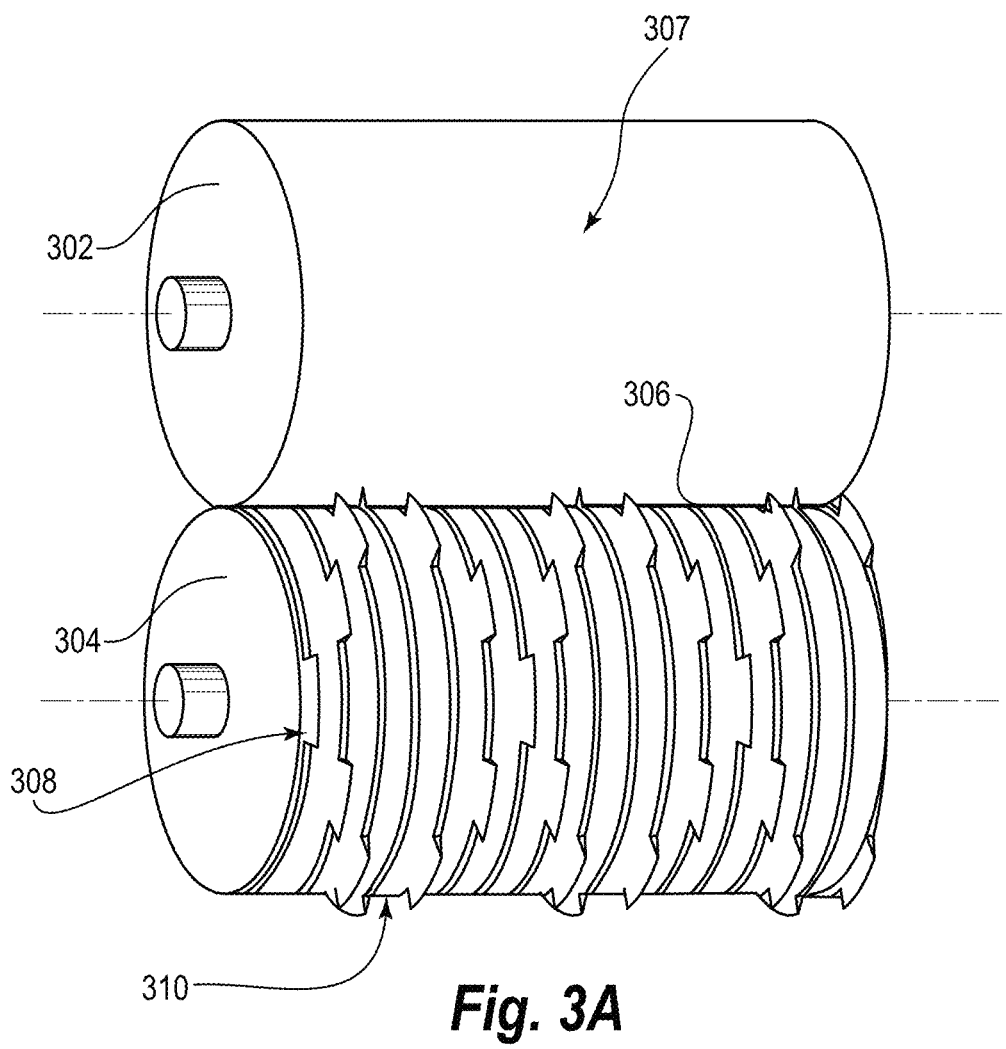
FIG. 3A shows a perspective view of a pair of embossing rollers for forming an embossing pattern in a film material according to one or more embodiments of the present disclosure.

FIG. 3A illustrates a pair of embossing rollers 302, 304 for forming an embossing pattern in a film material and that can be utilized in the manufacturing process 200 described above in regard to FIG. 2. Specifically, the pair of embossing rollers 302, 304 may include a first embossing roller 302 and a second embossing roller 304. Each of the first and second embossing rollers 302, 304 may be cylindrical and may have longitudinal axes that are parallel to each other and perpendicular to a machine direction. The first and second embossing rollers 302, 304 may define a passage 306 therebetween through which a film material may pass through to be embossed.

In some embodiments, as shown in FIG. 3A, a first embossing roller 302 may have a relatively smooth exterior surface 307, and the second embossing roller 304 may have an embossing pattern formed thereon. The embossing pattern of the second embossing roller 304 may have height of between about 10.0 mils and about 40.0 mils. In one or more embodiments, the embossing pattern can include a plurality of teeth 308 and grooves 310 extending generally radially outward in a direction orthogonal to an axis of rotation of the second embossing roller 304. Furthermore, the plurality of teeth 308 may be oriented relative to one another to form the embossing pattern in the film material. For example, the plurality of teeth 308 may be oriented relative to one another to form a diamond pattern in the film material. Furthermore, the embossing pattern may match one or more of the below-described patterns of peaks and valleys described in regard to FIGS. 4A-10C.

In some embodiments, the second embossing roller 304 may be formed from a relatively hard material (e.g., steel, ebonite, etc.), and the first embossing roller 302 may be formed from a softer material (e.g., rubber). In other words, the first and second embossing rollers 302, 304 may include a steel-to-rubber embosser. In alternative embodiments, both the first embossing roller 302 and the second embossing roller 306 may be formed from the relatively hard material (e.g., steel). Put another way, first and second embossing rollers 302, 304 may include a steel-to-steel embosser. Regardless of whether the first and second embossing rollers 302, 304 include a steel-to-rubber embosser or a steel-to-steel embosser, in some embodiments, the first embossing roller 304, the second embossing roller 304 or both rollers may include an electrically heated steel roll (e.g., means of heating). In alternative embodiments, the neither of the first and second embossing rollers 302, 304 are heated.

Referring to FIGS. 2 and 3A together, as noted above, during a manufacturing process, a flat film may pass through between the first embossing roller 302 and the second embossing roller 304. The second embossing roller 304 may heat the flat film and may press the flat film against the first embossing roller 302 (e.g., a pressure roller). By heating the flat film and pressing the flat film against the first embossing roller 302 (e.g., pressing the embossing pattern of the second embossing roller 304 against the flat film), the second embossing roller 304 embosses the flat film with the embossing pattern. Alternatively, as noted above, the first and second embossing rollers 302, 304 can emboss the film material without the use of heat.

Figure 3B:
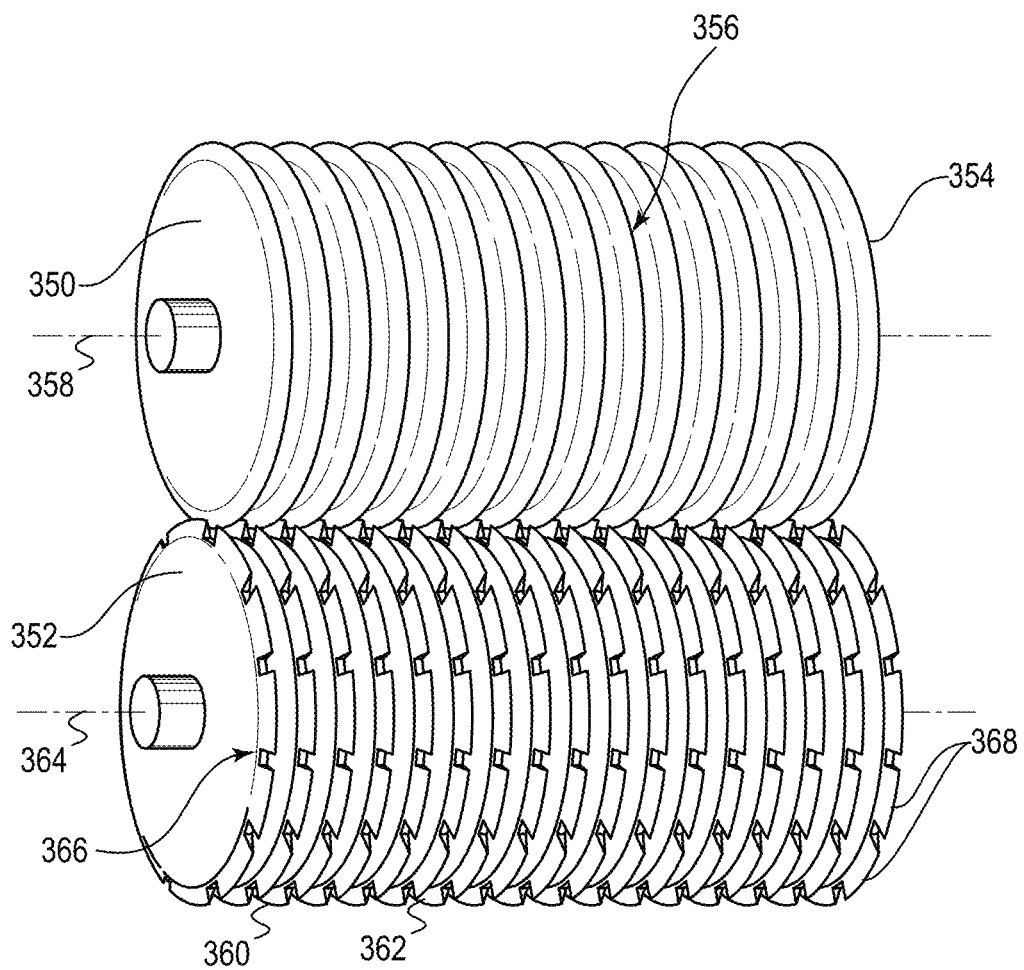
FIG. 3B shows a perspective view of a pair of SELFing rollers for forming an incrementally-stretched pattern in a film material according to one or more embodiments of the present disclosure.

FIG. 3B illustrates a pair of SELF'ing intermeshing rollers 350, 352 for creating strainable networks in a film. The first SELF'ing intermeshing roller 350 can include a plurality of ridges 354 and grooves 356 extending generally radially outward in a direction orthogonal to an axis of rotation 358. The second SELF'ing intermeshing roller 352 can also include a plurality of ridges 360 and grooves 362 extending generally radially outward in a direction orthogonal to an axis of rotation 358. As shown by FIG. 3B, however, the ridges 360 of the second SELF'ing intermeshing roller 352 can include a plurality of notches 366 that define a plurality of spaced teeth 368.

As mentioned briefly above, an incrementally-stretched film can be created using the SELF'ing intermeshing rollers 350, 352 as shown. In particular, as the film passes through the SELF'ing intermeshing rollers 350, 352, the teeth 368 can press a portion of the web out of plane to cause permanent, deformation of a portion of the film in a Z-direction. On the other hand, the portions of the film that pass between the notched regions 366 and the teeth 368 will be substantially unformed in the Z-direction, resulting in a plurality of deformed, raised, rib-like elements. For example, the film material can be incrementally-stretched in any of the manners described in U.S. patent application Ser. No. 13/837,469, filed on Mar. 15, 2013, to Bergman et al., the disclosure of which is incorporated in its entirety by reference herein.

In one or more embodiments, the SELF'ing intermeshing rollers 350, 352 may include microSELFing intermeshing rollers. For example, each of the ridges 360 and grooves 362 of the first and second SELF'ing intermeshing rollers 350, 352 may have a height (e.g., a depth of stretching) between a range of about 10 mils and about 40 mils. Furthermore, each of the spaced teeth 368 of the ridges 360 of the second SELF'ing intermeshing roller 352 may have a length (e.g., circumferential length) between about 50.0 mils and 250.0 mils.

Figure 4A:
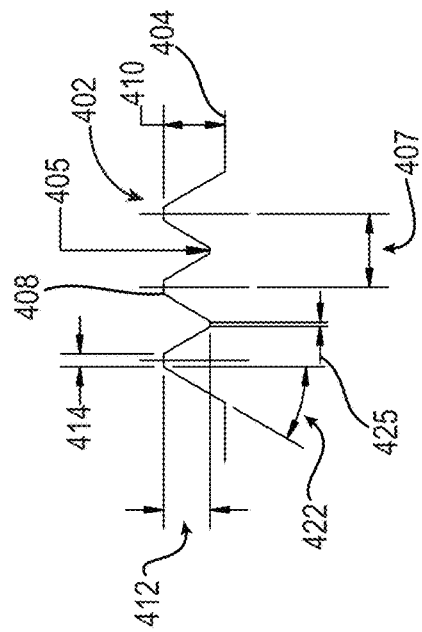
FIG. 4A shows a top view of a wrap material having a pattern embossed therein according to an embodiment of the present disclosure.
Figure 4B:
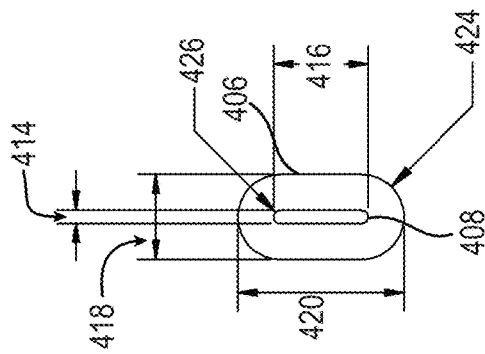
FIG. 4B shows partial side cross-sectional view of the wrap material of FIG. 4A showing a plurality of protrusions of the wrap material.
Figure 4C:
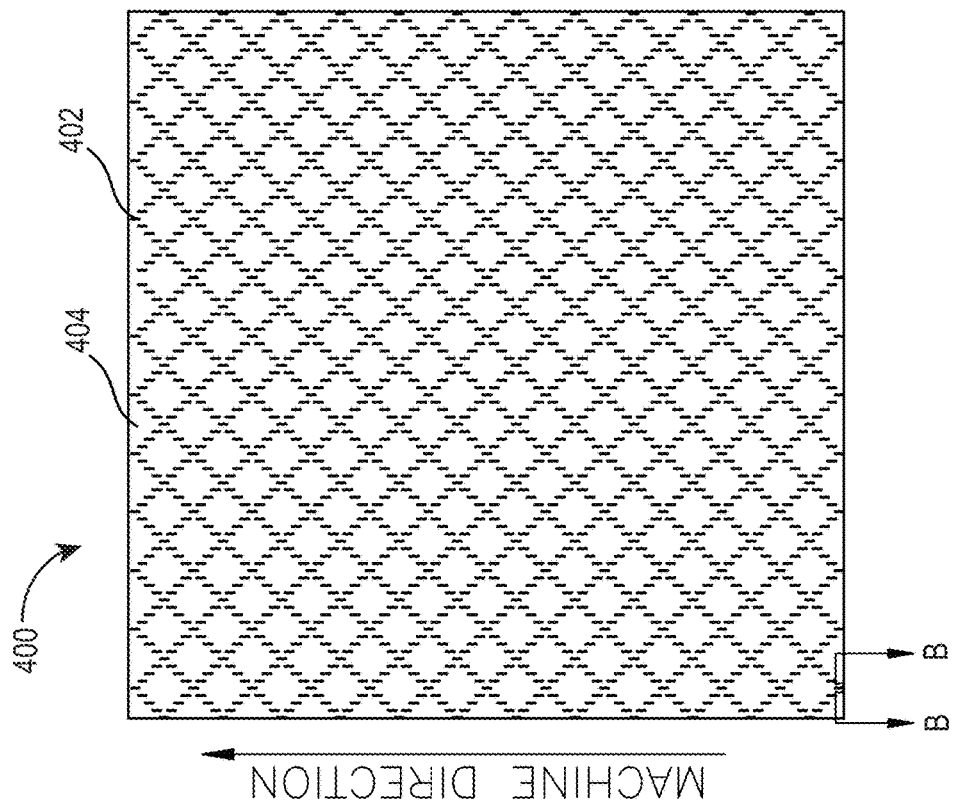
FIG. 4C shows a top view of a protrusion of the wrap material of FIG. 4A.

FIG. 4A shows a top schematic view of a portion of a wrap material 400 according to one or more embodiments of the present disclosure. FIG. 4B shows a partial cross-sectional side view of a portion of the wrap material 400 of FIG. 4A. FIG. 4C shows a top schematic view of a single protrusion 402 (e.g., peak) of the wrap material 400 according to one or more embodiments of the present disclosure. Referring to FIGS. 4A-4C together, in some embodiments, the wrap material 400 may include a plurality of protrusions 402 (e.g., peaks) and a plurality of planar portions 404. The plurality of protrusions 402 may extend away (e.g., upward) from a plane defined by the plurality of planar portions 404 of the wrap material 400. For example, the plurality of protrusions 402 may extend outward from a side of the wrap material in a direction at least substantially orthogonal to the plane.

In one or more embodiments, the plurality of protrusions 402 may be oriented relative to one another in at least substantially diagonal lines extending across the wrap material 400 (e.g., from a first edge of the wrap material 400 to a second opposite edge of the wrap material 400). Furthermore, the diagonal lines defined by the plurality of protrusions 402 may form a cross-hatch pattern (e.g., a diamond cross-hatch pattern) on the wrap material 400, and areas between the cross-hatching diagonal lines may define the planar portions 404 of the wrap material 400. For example, each of the planar portions 404 of the wrap material 400 may have an at least general diamond shape.

Furthermore, each pair of adjacent protrusions 402 of the plurality of protrusions 402 within a respective diagonal line may define a valley 405 therebetween (i.e., a valley 405 of a plurality of valleys 405). In one or more embodiments, each valley 405 of the plurality of valleys 405 may have an at least substantially planar bottom surface (e.g., floor surface). As a result, adjacent protrusions 402 may be separated from each by at least some distance (e.g., a width of the planar bottom surface of the separating valley 405). Furthermore, when the wrap material 400 is laid flat on a planar surface, each planar bottom surface of each valley 405 of the plurality of valleys 405 may be at least substantially coplanar with the other planar bottom surfaces of the other valleys 405 of the plurality of valleys 405.

Each protrusion 402 of the plurality of protrusions 402 may have a general oblong frustoconical shape. Specifically, each protrusion 402 of the plurality of protrusions 402 may include a base portion 406 that is coplanar with the planar portions 404 of the wrap material 400 and that tapers to a peak portion 408 as the protrusion 402 extends away from the plane defined by the plurality of planar portions 404 of the wrap material 400. Furthermore, when the wrap material 400 is laid flat on a planar surface, each peak portion 408 of each protrusion 402 of the plurality of protrusions 402 may be at least substantially coplanar with the other peak portions 408 of other protrusions 402 of the plurality of protrusions 402. Additionally, longitudinal lengths of the base portion 406 and peak portion 408 of each protrusion 402 may be aligned with (e.g., parallel to) a machine direction of the wrap material 400. Although specific shaped protrusions (e.g., general oblong frustoconical shaped protrusions) have been described herein, the disclosure is not so limited, and the plurality of protrusions 402 may include any shape of protrusion. For example, the plurality of protrusions 402 may include cubical shapes, pyramids, semispherical shapes, conical shapes, frustoconical shapes, polyhedron shapes, squared based domes, diamond shape based domes, etc. or any combinations thereof.

As mentioned briefly above in regard to FIG. 1, the wrap materials of the present disclosure may include an active surface and an activatable surface on both sides of the wrap materials. In the embodiments illustrated in FIGS. 4A-4C, the illustrated active surface of the wrap material 400 includes the surfaces of the peak portions 408 of the wrap material 400. For example, if the wrap material 400 were placed on a surface (e.g., glass) without any additional load, only the surfaces of the peak portions 408 of the wrap material 400 would contact the surface (e.g., glass). Furthermore, the activatable surface of the wrap material 400 includes the surfaces of the peak portions 408, at least some portions of the side surfaces of the protrusions 402, at least some portions of the valleys 405 defined between adjacent protrusions 402, and at least some portions of the planar portions 404 of the wrap material 400. In particular, when the wrap material 400 is placed against a surface and compressed against the surface via a load, the surfaces of the peak portions 408, at least some portions of the side surfaces of the protrusions 402, at least some portions of the valleys 405 defined between adjacent protrusions 402, and at least some portions of the planar portions 404 of the wrap material 400 may be caused to come into contact with the surface. As a result, the wrap materials ability to adhere to the surface may increase due to more surface area of the wrap material 100 contacting the surface. Moreover, in one or more embodiments, the activatable surface of the wrap material may not include any adhesive layers.

In one or more embodiments, the active surface of the wrap material may include between about 15% and about 35% of a land area of the wrap material. In additional embodiments, the active surface of the wrap material may include between about 15% and about 60% of a land area of the wrap material. For example, in some embodiments, the active surface of the wrap material may include about 21% of the land area of the wrap material. As will be understood by one of ordinary skill in the art, the active surface size (e.g., percentage a land area) of a wrap material will vary depending on which side of the wrap material is being considered.

During use, the wrap material 400 may exhibit minimal adhesive properties (e.g., tendencies to stick to a surface) until activated by a user. In other words, even when the active surface of the wrap material 400 is placed against a surface, the wrap material 400 will not significantly bond to the surface without further action, as described above in regard to the blocking force of the wrap material 400. Particularly, when placed against a surface, the wrap material 400 may be supported upon the peak portions 408 of the plurality of protrusions 402 (i.e., the active surface of the wrap material 400) while resting on the surface.

In one or more embodiments, the wrap material 400 may be activated (e.g., secured to a surface) by selectively compressing a portion of the wrap material 400 against a surface upon which a user desires that the wrap material 400 adhere. In particular, the user may place the active surface of the wrap material 400 against a surface (e.g., a rim of a bowl) and may selectively apply a force against an area of the wrap material 400 (e.g., area of the wrap material 400 proximate (i.e., above) the rim of the bowl). By selectively applying a force against the wrap material 400, the user may cause the 3D structure of the wrap material (described above in regard to FIG. 2) to at least partially collapse (e.g., compress) and may cause portions of the activatable surface of the wrap material 400 to come into contact with and be pressed against the surface. Due to the compression force and the activatable surface of the wrap material 400 coming into contact with the surface, the selected portion of the wrap material 400 may be at least partially bonded (e.g., adhered, tacked, etc.) to the surface. The compression and activation may be accomplished in a variety of ways, including direct compression in a Z-direction, and/or stretching/extension in an X-Y direction, and then wrapping the wrap material 226 around the edge of a container while maintaining at least some force along the longitudinal axis of the wrap material 226.

As noted above in regard to the peel adhesion force exhibited by wrap materials of the present disclosure, wrap material 400 exhibits sufficient adhesive properties to form a bond to most common materials that is sufficiently strong to survive (e.g., endure) conventional handling of food containers without failure. In other words, the wrap material 400 may maintain the bond to the surface even when subject to typical handling. The bond between the wrap material 400 and the surface, in one or more embodiments, is also sufficient to provide a barrier seal against transmission of oxygen, moisture/moisture vapor, odor, etc. such that perishable items may be satisfactorily enclosed and preserved to the extent of the barrier properties of the wrap material 400 itself. Furthermore, the activatable surface of the wrap material 400 enables the wrap material 400 to bond with more complex shaped surfaces (e.g., uneven surfaces, surfaces with ridges, bumps, and/or veins, etc.) in comparison to conventional wrap materials.

Referring still to FIGS. 4A-4C, each protrusion 402 may have a height 410 (e.g., a distance from a planar portion 404 of the wrap material 400 to a peak portion 408 of the protrusion 402 may be within a range of about 25.0 mils to about 50.0 mils. Additionally, a peak-to-peak distance 407 between adjacent peaks within a respective diagonal line (e.g., a lateral distance between centers of parallel portions of adjacent peaks within a respective diagonal line) may be within a range of about 25.0 mils to about 50.0 mils. Moreover, each valley 405 defined between adjacent protrusions 402 within a respective diagonal line may have a depth 412 (e.g., a distance from a peak portion 408 of a protrusion 402 defining the valley 405 to a bottom of the valley 405) within a range of about 20.0 mils to about 30.0 mils. Accordingly, in some embodiments, the valleys 405 defined between adjacent protrusions 402 may be raised relative to the planar portions 404 of the wrap material 400. For example, in some embodiments, both the plurality of protrusions 402 and the plurality of valleys 405 may extend away (e.g., upward) from the plane defined by the plurality of planar portions 404 of the wrap material 400 in a direction orthogonal to the plane. Furthermore, each valley 405 may have a width 425 (e.g., a distance between adjacent protrusions 402 defining the valley 405) within a range of about 1.5 mils to about 10.0 mils.

In one or more embodiments, each peak portion 408 of each protrusion 402 may have a width 414 within a range of about 5.0 mils to about 10.0 mils and a longitudinal length 416 within a range of about 25.0 mils to about 75.0 mils. Also, each base portion 406 of each protrusion 402 may have a width 418 within a range of about 25.0 mils to about 75.0 mils and a longitudinal length 416 within a range of about 75.0 mils to about 100.0 mils. Additionally, a lateral side of each protrusion 402 may define an angle 422 with a line extending in a direction normal to the plane defined by the planar portions 404 of the wrap material 400 and extending through a center of a peak portion 408 of a respective protrusion 402 within a range of about 25° to about 45°. Furthermore, each longitudinal end of a base portion 406 of a protrusion 402 may define a semicircle having a radius 424 within a range of about 20.0 mils to about 40.0 mils. Likewise, each longitudinal end of a peak portion 408 of a protrusion 402 may define a semicircle having a radius 426 within a range of about 2.5 mils to about 4.5 mils.

Figure 5:
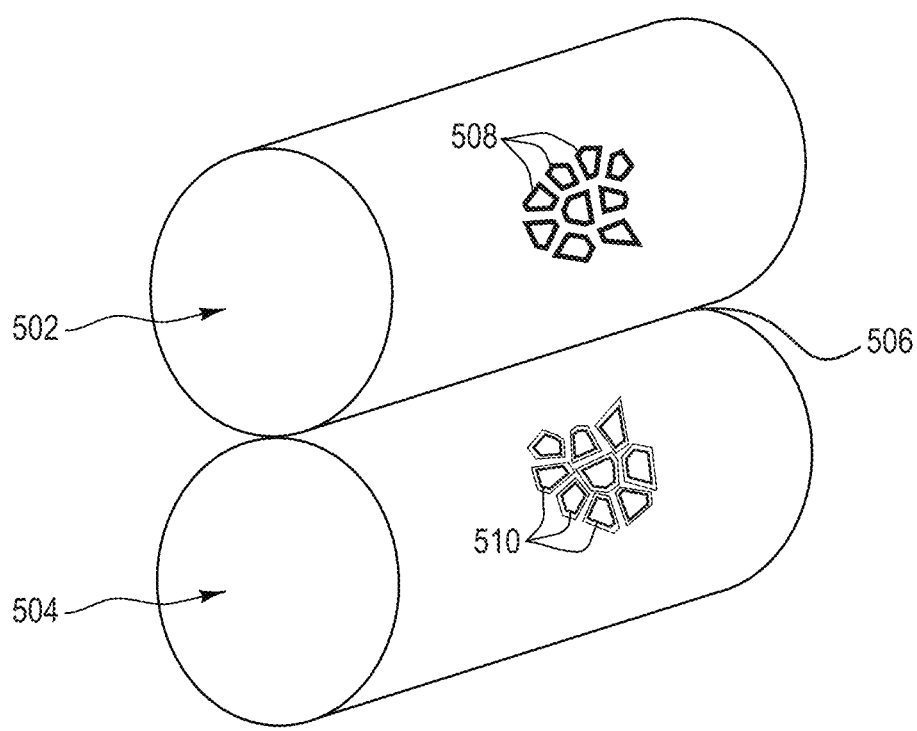
FIG. 5 shows a perspective view of a pair of embossing rollers for forming an embossing pattern in a film material according to additional embodiments of the present disclosure.

FIG. 5 illustrates a pair of embossing rollers 502, 504 for forming an embossing pattern in a film material and that can be utilized in the manufacturing process 200 described above in regard to FIG. 2 according to another embodiment of the present disclosure. Specifically, the pair of embossing rollers 502, 504 may include a first embossing roller 502 and a second embossing roller 504. Each of the first and second embossing rollers 502, 504 may be cylindrical and may have longitudinal axes that are parallel to each other. The first and second embossing rollers 502, 504 may define a passage 506 therebetween through which a film material may pass through to be embossed.

In some embodiments, as shown in FIG. 5, a first embossing roller 502 may have a embossing pattern 508 formed thereon, and the second embossing roller 304 may have a correlating (e.g., matching) receiving embossing pattern 510 thereon (e.g., engraved therein). The embossing pattern 508 of the first embossing roller 502 may have height of between about 10.0 mils and about 40.0 mils, and the receiving embossing pattern 510 of the second embossing roller 504 may have depth of between about 10.0 mils and about 40.0 mils. In one or more embodiments, the embossing pattern 508 and the receiving embossing pattern 510 can include a plurality of random polygon shaped protrusions and a plurality of matching random polygon shaped recesses, respectively. In other words, the embossing pattern 508 may include a mosaic of random polygon shaped protrusions and the receiving embossing pattern 510 may include a matching mosaic of random polygon shaped recesses.

In some embodiments, one of the first and second embossing rollers 502, 504 may be formed from a relatively hard material (e.g., steel, ebonite or other suitable hard material), and the other may be formed from a softer material (e.g., rubber or other suitable softer material). In other words, the first and second embossing rollers 502, 504 may include a steel-to-rubber embosser. In alternative embodiments, both the first and second embossing rollers 502, 504 may be formed from the relatively hard material (e.g., steel). Put another way, first and second embossing rollers 502, 504 may include a steel-to-steel embosser. Regardless of whether the first and second embossing rollers 502, 504 include a steel-to-rubber embosser or a steel-to-steel embosser, in some embodiments, the one or more of first and second embossing rollers 502, 504 may include an electrically heated steel roll (e.g., means of heating). In alternative embodiments, the neither of the first and second embossing rollers 502, 504 are heated.

Figure 6A:
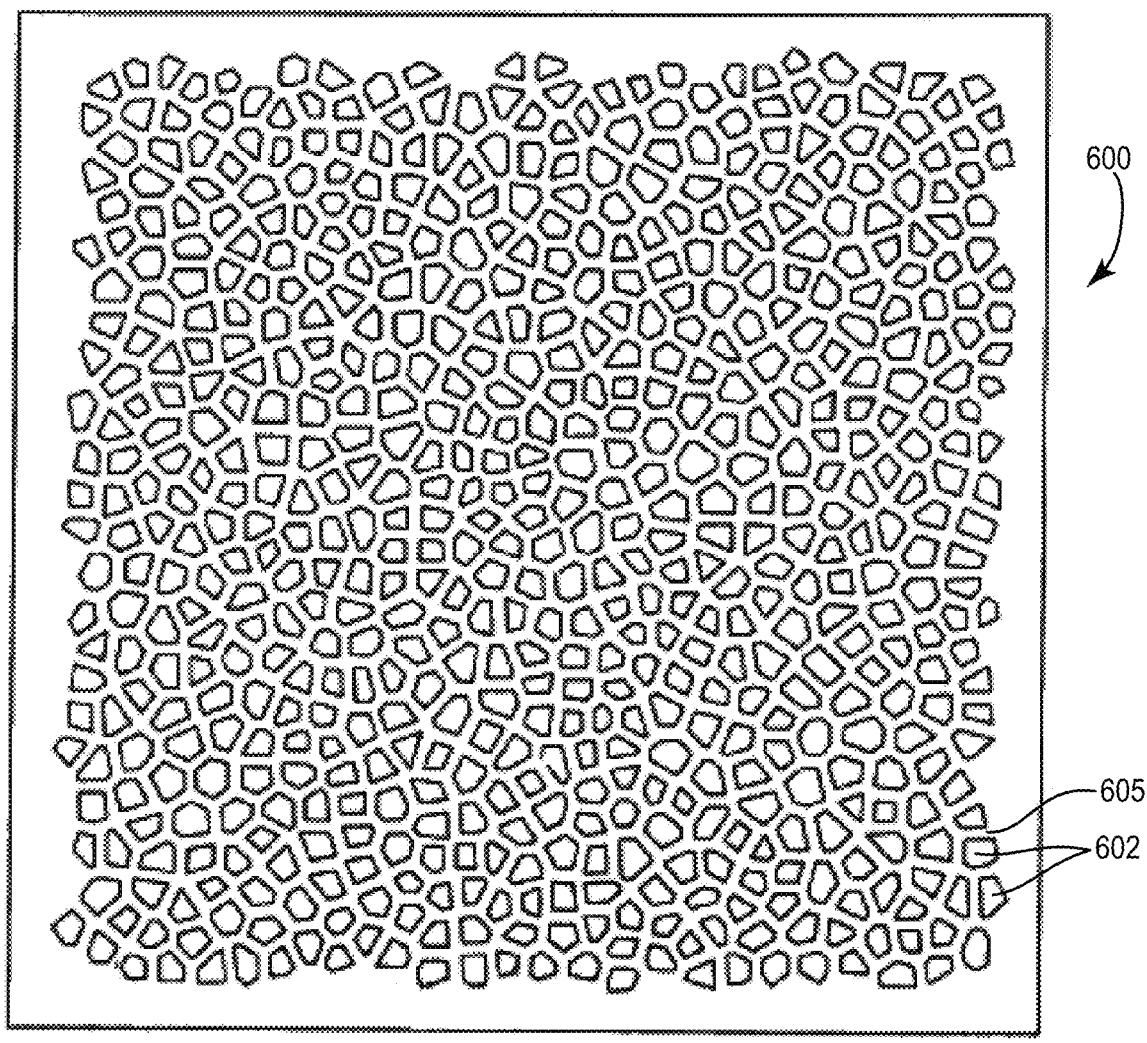
FIG. 6A shows a top view of a wrap material having a pattern embossed therein according to another embodiment of the present disclosure.
Figure 6B:
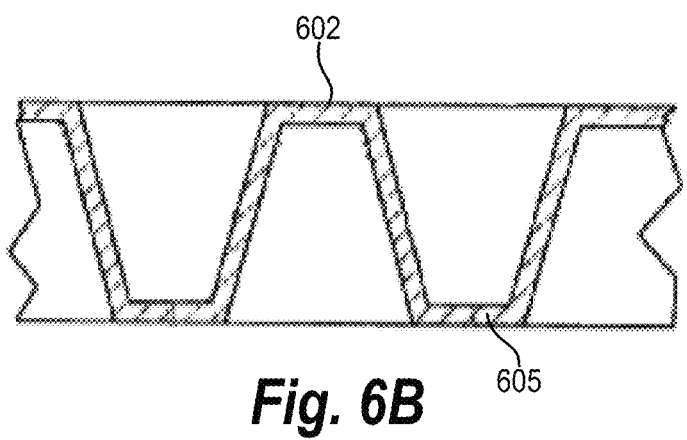
FIG. 6B shows partial side cross-sectional view of the wrap material of FIG. 6A showing a plurality of protrusions of the wrap material.

FIG. 6A shows a top schematic view of a portion of a wrap material 600 that may be formed utilizing the pair of embossing rollers 502, 504 of FIG. 5 according to one or more embodiments of the present disclosure. FIG. 6B shows a partial cross-sectional side view of a portion of the wrap material 600 of FIG. 6A. Referring to FIGS. 6A and 6B together, similar to the wrap material 400 of FIGS. 4A-4C, the wrap material 600 includes a plurality of protrusions 602 and a plurality of valleys 605. Furthermore, the plurality of protrusions 602 may include a plurality of random polygon shaped protrusions, and the plurality of valleys 605 may be defined between adjacent protrusions 602 of the plurality of protrusions 602.

In the embodiments described in regard to FIGS. 6A and 6B, the active surface of the wrap material 600 may include between about 35% and 60% of the land area of the wrap material 600. For example, the active surface of the wrap material 100 may include about 50% of the land area of the wrap material 600.

Figure 7B:
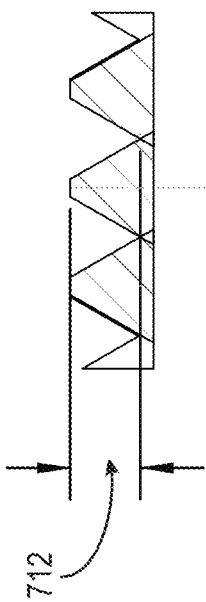
FIG. 7B shows partial side cross-sectional view of the wrap material of FIG. 7A showing a plurality of protrusions of the wrap material.
Figure 7C:
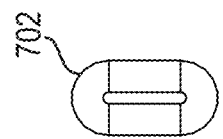
FIG. 7C shows a top view of a protrusion of the wrap material of FIG. 7A.
Figure 7A:
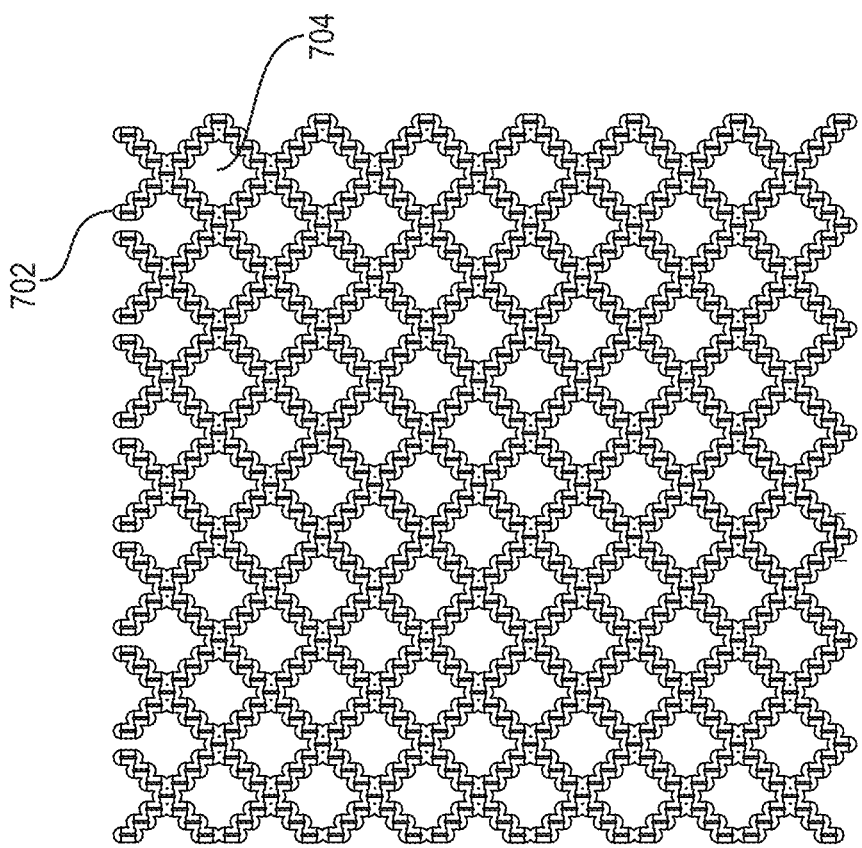
FIG. 7A shows a top view of a wrap material having a pattern embossed therein according to another embodiment of the present disclosure.

FIG. 7A shows a top schematic view of a portion of a wrap material 700 according to additional embodiments of the present disclosure. FIG. 7B shows a partial cross-sectional side view of a portion of the wrap material 700 of FIG. 7A. FIG. 7C shows a top schematic view of a single protrusion 702 (e.g., peak) of the wrap material according to one or more embodiments of the present disclosure. Referring to FIGS. 7A-7C together, the wrap material 700 may be similar to the wrap material 400 described in regard to FIGS. 4A-4C. For example, the wrap material 700 may include a plurality of protrusions 702 (e.g., peaks) and a plurality of planar portions 704. Furthermore, the plurality of protrusions 702 may be similar to the protrusions 402 described above in regard to FIGS. 4A-4C.

For example, each protrusion 702 of the plurality of protrusions 702 may have a general oblong frustoconical shape. Specifically, each protrusion 702 of the plurality of protrusions 702 may include a base portion 706 that tapers to peak portion 408 of the protrusion 702. Additionally, longitudinal lengths of the base portion 706 and peak portion 708 of each protrusion 702 may be inline with (e.g., parallel to) a machine direction of the wrap material 700. Moreover, the protrusions may have the same dimensions as the protrusions 402 described above in regard to FIGS. 4A-4C.

Additionally the plurality of protrusions 702 may be oriented relative to one another in at least substantially diagonal lines extending across the wrap material 700.

Furthermore, the diagonal lines defined by the plurality of protrusions 702 may form a cross-hatch pattern (e.g., a diamond cross-hatch pattern) on the wrap material 700, and areas between the cross-hatching diagonal lines may define the planar portions of the wrap material 700. For example, similar to the planar portions described above in regard to FIGS. 4A-4C, each of the planar portions 704 of the wrap material 700 may have an at least general diamond shape. However, unlike the protrusions 402 described in regard to FIGS. 4A-4C, adjacent protrusions 702 within respective diagonal lines may at least partially overlap with each other along laterals sides of the adjacent protrusions 702. As a result, each valley 705 defined between adjacent protrusions 702 may have an at least general V-shaped cross-section. Furthermore, the valleys 705 may have a depth 712 within a range of about 15.0 mils and about 30.0 mils.

Figure 8C:
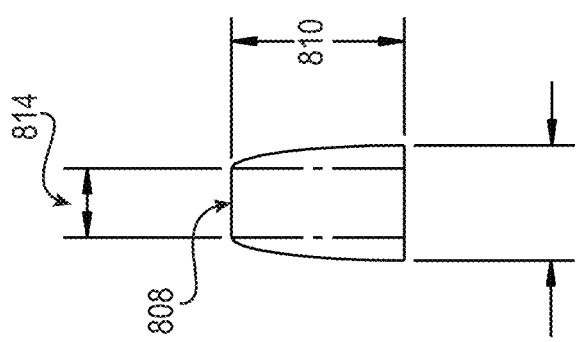
FIG. 8C shows partial side cross-sectional view of a protrusion of the wrap material of FIG. 8A.
Figure 8D:
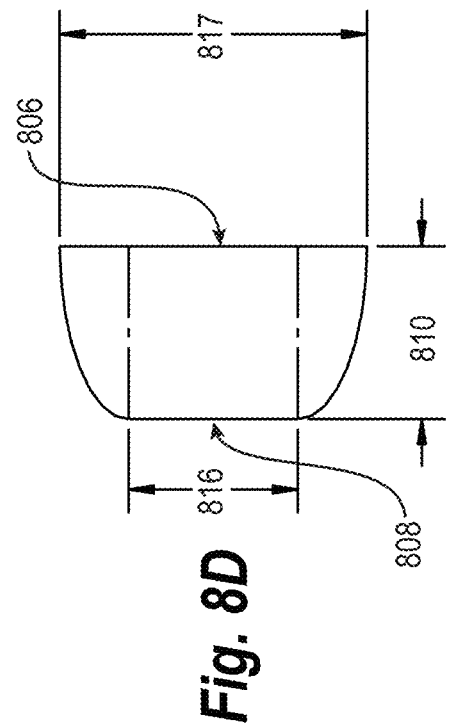
FIG. 8D shows partial side cross-sectional view of a protrusion of the wrap material of FIG. 8A that is perpendicular to the view depicted in FIG. 8C.
Figure 8A:
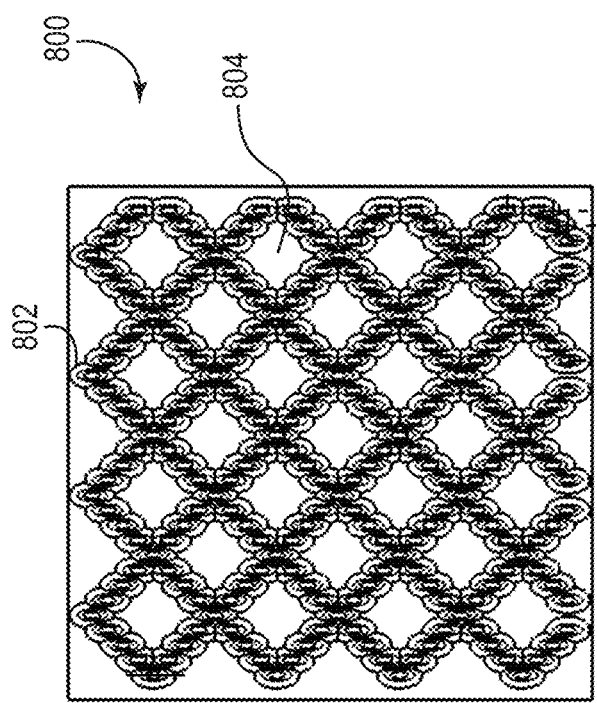
FIG. 8A shows a top view of a wrap material having a pattern embossed therein according to another embodiment of the present disclosure.
Figure 8B:
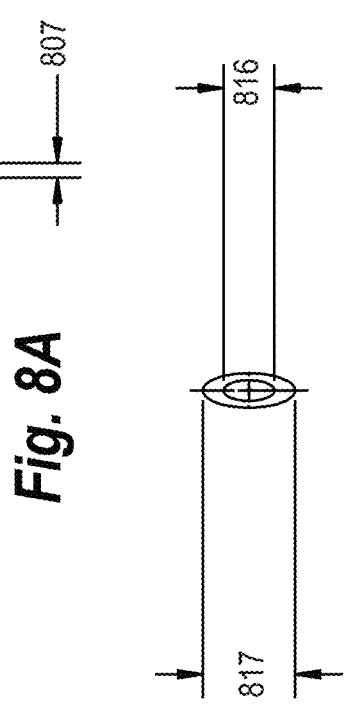
FIG. 8B shows a top view of a protrusion of the wrap material of FIG. 8A.

FIG. 8A shows a top schematic view of a portion of a wrap material 800 according to additional embodiments of the present disclosure. FIG. 8B shows a top schematic view of a single protrusion 802 (e.g., peak) of the wrap material according to one or more embodiments of the present disclosure. FIG. 8C shows a partial cross-sectional side view of a protrusion of the wrap material 800 of FIG. 8A. FIG. 8D shows a partial cross-sectional side view of a protrusion of the wrap material 800 of FIG. 8A that is perpendicular to the view illustrated in FIG. 8C. Referring to FIGS. 8A-8D together, the wrap material 800 may be similar to the wrap material 400 described in regard to FIGS. 4A-4C.

Specifically, the orientation of the protrusions 802 and planar surfaces 804 of the wrap material 800 may be similar to the orientation of the protrusions and planar surfaces described above in regard to FIGS. 4A and 7A. However, the protrusions 802 of the wrap material 800 may each include a flat topped oblong elliptic paraboloid (i.e., flat topped oblong dome), and the protrusions 802 may at least partially overlap with each other within a respective diagonal line.

Each protrusion 802 may have a height 810 (e.g., a distance from a planar portion of the wrap material 800 to a peak (e.g., a flat top surface) within a range of about 25.0 mils to about 75.0 mils. Additionally, a peak-to-peak distance 807 between adjacent peaks within a respective diagonal line (e.g., a lateral distance between centers of adjacent peaks within a respective diagonal line) may be within a range of about 25.0 mils to about 50.0 mils.

In one or more embodiments, each peak portion 808 (e.g., flat top surface) of each protrusion 802 may have a width 814 within a range of about 15.0 mils to about 25.0 mils and a longitudinal length 816 within a range of about 25.0 mils to about 75.0 mils. Also, each base portion 806 of each protrusion 802 may have a width 818 within a range of about 20.0 mils to about 75.0 mils and a longitudinal length 817 within a range of about 70.0 mils to about 100 mils.

Figure 9:
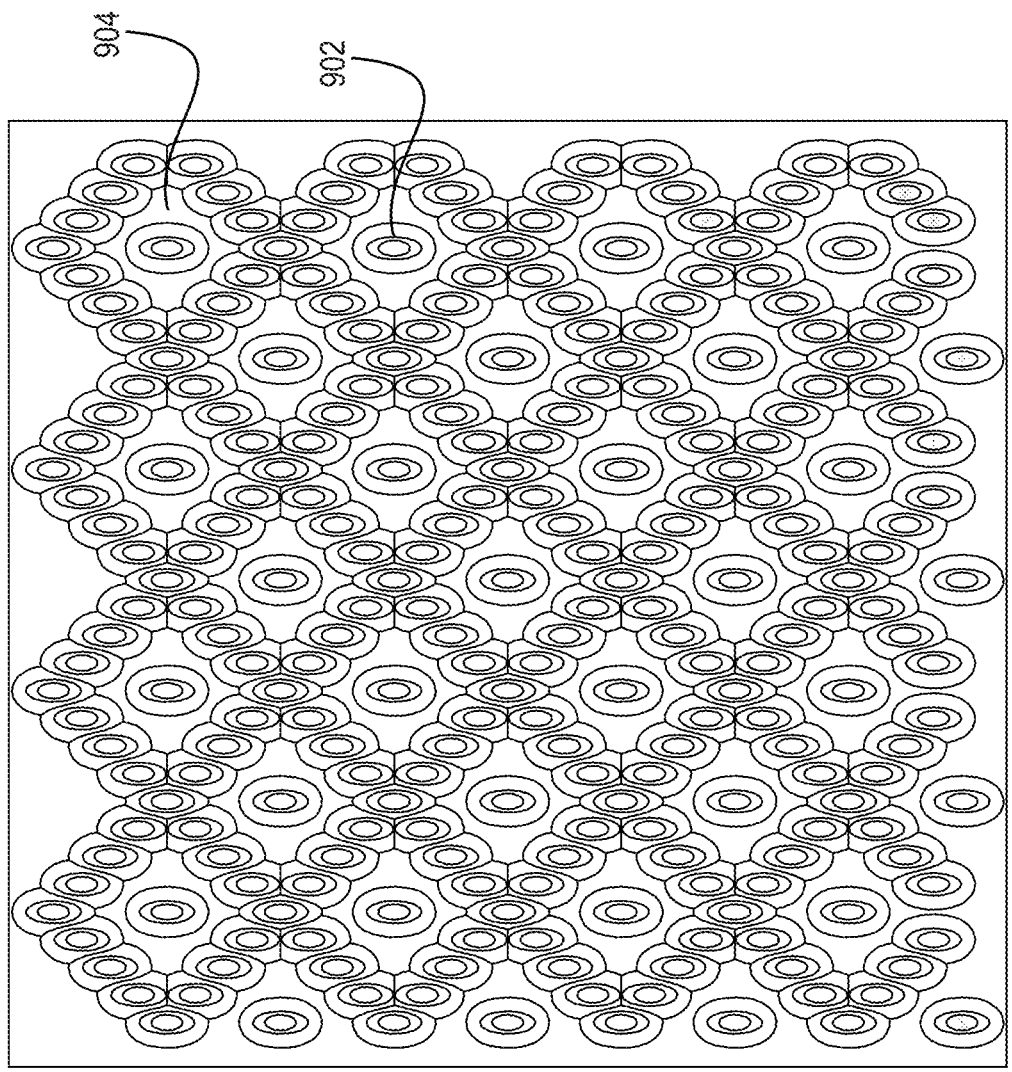
FIG. 9 shows a top view of a wrap material having a pattern embossed thereon according to another embodiment of the present disclosure.

FIG. 9 shows a top schematic view of a portion of a wrap material 900 according to additional embodiments of the present disclosure. The wrap material 900 may be the same as the wrap material 800 described above in regard to FIGS. 8A-8D; however, the wrap material 900 may include additional protrusions 902 disposed at centers of the planar portions 904 of the wrap material 900.

Figure 10B:
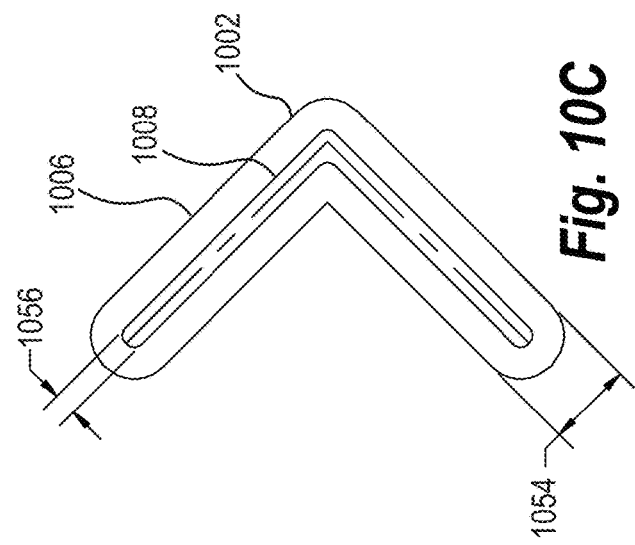
FIG. 10B shows partial side cross-sectional view of the wrap material of FIG. 10A showing a plurality of protrusions of the wrap material.
Figure 10C:
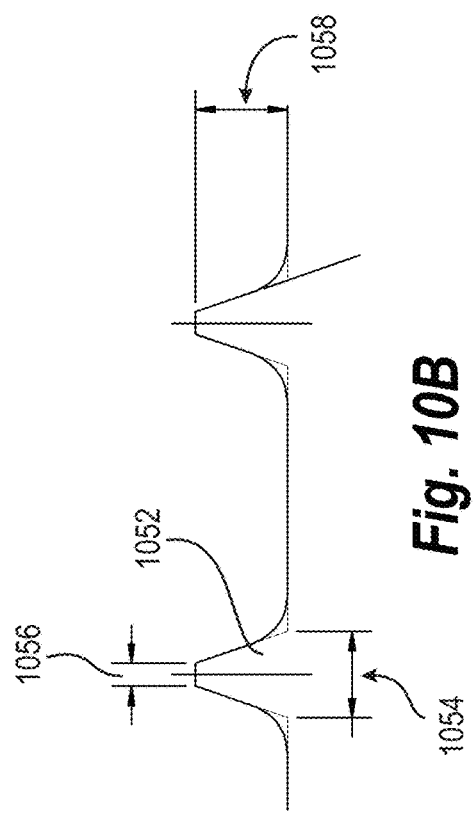
FIG. 10C shows a top view of a protrusion of the wrap material of FIG. 10A.
Figure 10A:
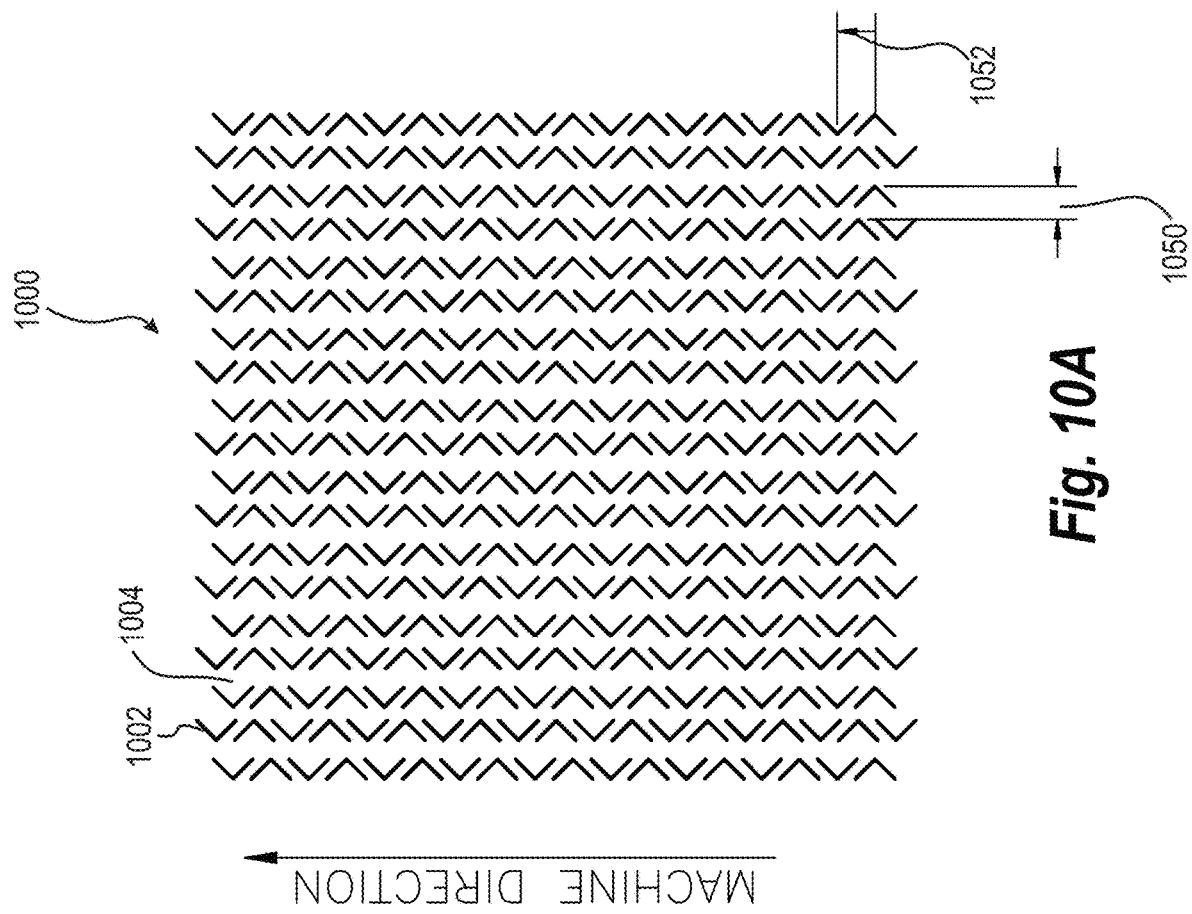
FIG. 10A shows a top view of a wrap material having a pattern embossed therein according to another embodiment of the present disclosure.

FIG. 10A shows a top schematic view of a portion of a wrap material 1000 according to one or more embodiments of the present disclosure. FIG. 10B shows a partial cross-sectional side view of a portion of the wrap material 1000 of FIG. 10A. FIG. 10C shows a top schematic view of a single protrusion 1002 (e.g., peak) of the wrap material 1000 according to one or more embodiments of the present disclosure. Referring to FIGS. 10A-10C together, in some embodiments, the wrap material 1000 may include a plurality of protrusions 1002 (e.g., peaks) and a plurality of planar portions 1004. The plurality of protrusions 1002 may extend away (e.g., upward) from a plane defined by the plurality of planar portions 1004 of the wrap material 1000.

Each protrusion 1002 of the plurality of protrusions 1002 may have a general chevron shape (i.e., a V-shape or a shape consisting of two linear portions meeting at an angle). Specifically, each protrusion 1002 of the plurality of protrusions 1002 may include a base portion 1006 having a general chevron shape that tapers to peak portion 1008 having a general chevron shape. In one or more embodiments, the plurality of protrusions 1002 may be oriented relative to one another in lines extending in a machine direction of the wrap material 1000. Furthermore, a point of the chevron shape of each protrusion 1002 may point in a direction at least generally perpendicular to the machine direction of the wrap material 1000. Additionally, the plurality of protrusions 1002 may be oriented relative to one another within the lines in alternating orientations. In other words, the points of the chevron shapes of adjacent protrusions 1002 may point in opposite directions.

In some embodiments, the base portion 1006 of each protrusion 1002 may have a width 1054 within a range of about 35.0 mils to about 55.0 mils. Additionally, the peak portion 1008 of each protrusion 1002 may have a width 1056 within a range of about 5.0 mils to about 20.0 mils. Furthermore, the two linear portions of the chevron shape of each protrusion 1002 may meet at about a 90° angle. Moreover, each protrusion 1002 may have a height 1058 of about 38.0 mils to about 58.0 mils.

In one or more embodiments, the lines formed by the plurality of protrusions 1002 may be spaced apart from each other by a distance 1050 within a range of about 125.0 mils to about 200.0 mils. For example, a point of the chevron shape of a protrusion 1002 in a first line may be spaced apart from a point of the chevron shape of a correlating protrusion in a second adjacent line by the distance 1050. Furthermore, points of chevron shapes of adjacent protrusions within a same line may be spaced apart from each other by a distance 1052 within a range of about 150.0 mils to about 250.0 mils.

In the embodiments described above in regard to FIGS. 10A-10C, the active surface of the wrap material 100 may include between about 10% and about 25% of a land area of the wrap material 1000. For example, the active surface of the wrap material 100 may include about 16% of the land area of the wrap material 1000.

The present disclosure may be embodied in other specific forms without departing from its spirit or essential characteristics. Thus, the described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

We claim:

1. An activatable wrap material comprising:
   a thermoplastic film comprising a first side and a second side opposite the first side, the thermoplastic film comprising a composition with percent by weight of about 47.0% to about 99.5%, of low density polyethylene, about 0.0% to about 50.0% of linear-low density polyethylene, and about 0.5% to about 3.0% of cling additives;
   a plurality of protrusions extending outward from the first side of the activatable wrap material and oriented in a pattern across the first side of the activatable wrap material, wherein the plurality of protrusions are formed into the thermoplastic film;
a plurality of planar portions defined within the first side of the activatable wrap material and throughout the plurality of protrusions;
wherein the activatable wrap material uncouples average peel adhesion force, from one or more of average roll unwind force or average blocking force and exhibits an average peel adhesion force, when activated against a surface, between about 1.50 g/in to about 3.25 g/in; and
wherein the activatable wrap material exhibits one or more of:
an average roll unwind force, when wound on a roll, between about 1.50 g/in to about 5.0 g/in, or
an average blocking force, when contacting itself, between about 0.40 g/in$^2$ to about 1.30 g/in$^2$;
wherein the activatable wrap material does not comprise adhesive layer separate from the thermoplastic film.

2. The activatable wrap material of claim 1, wherein the cling additives comprise polyisobutylene.

3. The activatable wrap material of claim 1, further comprising an active surface comprising between about 15% and about 60% of a surface area of the first side of the activatable wrap material.

4. The activatable wrap material of claim 3, wherein the active surface of the activatable wrap material comprises between about 25% and about 50% of the surface area of the first side of the activatable wrap material.

5. The activatable wrap material of claim 3, wherein the active surface of the activatable wrap material comprises 21% of the surface area of the first side of the activatable wrap material.

6. The activatable wrap material of claim 1, wherein:
the average roll unwind force, when wound on a roll, is between about 2.50 g/in to about 5.00 g/in; and
the average blocking force, when contacting itself, is between about 0.40 g/in$^2$ to about 1.1 g/in$^2$.

7. The activatable wrap material of claim 6, wherein:
the average roll unwind force is less than 1.5 times the average peel adhesion force of the activatable wrap material; and
the average peel adhesion force, proportionally, is more than 1.5 times the average blocking force of the activatable wrap material.

8. An activatable wrap material, comprising:
a 3D structure formed into a thermoplastic film material, the thermoplastic film material comprising a composition with percent by weight of about 47.0% to about 99.5%, of low density polyethylene, about 0.0% to about 50.0% of linear-low density polyethylene, and about 0.5% to about 3.0% of cling additives, the 3D structure comprising a plurality of protrusions oriented relative to each other in a pattern extending across a side of the activatable wrap material and a plurality of planar portions extending in a plane defined by the side of the activatable wrap material;
an active surface comprising between about 15% and about 60% of a surface area of the side of the activatable wrap material;
wherein the activatable wrap material uncouples average peel adhesion force, from one or more of average roll unwind force or average blocking force and exhibits an average peel adhesion force, when activated against a surface, between about 1.50 g/in to about 3.25 g/in; and
wherein the activatable wrap material exhibits an average roll unwind force, when wound on a roll, between about 1.50 g/in to about 5.0 g/in;
wherein the activatable wrap material does not comprise an adhesive layer separate from the thermoplastic film material.

9. The activatable wrap material of claim 8, wherein the cling additives comprise polyisobutylene.

10. The activatable wrap material of claim 8, wherein each protrusion of the plurality of protrusions comprises a general oblong frustoconical shape.

11. The activatable wrap material of claim 8, wherein each protrusion of the plurality of protrusions comprises a flat topped oblong elliptic paraboloid.

12. The activatable wrap material of claim 8, wherein each protrusion of the plurality of protrusions comprises a polygon shape, and wherein orientations of the plurality of protrusions relative to one another form a mosaic across the activatable wrap material.

13. The activatable wrap material of claim 8, wherein the activatable wrap material exhibits an average peel adhesion force, when activated against a surface, between about 2.00 g/in to about 2.85 g/in.

14. The activatable wrap material of claim 8, wherein the activatable wrap material exhibits an average roll unwind force, when wound on a roll, between about 3.00 g/in to about 4.50 g/in.

15. The activatable wrap material of claim 8, wherein the activatable wrap material further exhibits an average blocking force, when contacting itself, between about 0.40 g/in$^2$ to about 1.30 g/in$^2$.

16. The activatable wrap material of claim 15, wherein the activatable wrap material further exhibits an average blocking force, when contacting itself, between about 0.50 g/in$^2$ to about 1.10 g/in$^2$.

17. The activatable wrap material of claim 15, wherein the activatable wrap material exhibits an average peel adhesion force that, proportionally, is at least 1.5 times an exhibited blocking force of the activatable wrap material.

* * * * *